United States Patent
Leng

(10) Patent No.: US 12,356,295 B2
(45) Date of Patent: Jul. 8, 2025

(54) ON-DEMAND SENSING OF DYNAMIC SENSING AREA

(71) Applicant: Nokia Technologies Oy, Espoo (FI)

(72) Inventor: Xiaobing Leng, Shanghai (CN)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 18/868,884

(22) PCT Filed: Jun. 6, 2022

(86) PCT No.: PCT/CN2022/097240
§ 371 (c)(1),
(2) Date: Nov. 25, 2024

(87) PCT Pub. No.: WO2023/236024
PCT Pub. Date: Dec. 14, 2023

(65) Prior Publication Data
US 2025/0175770 A1    May 29, 2025

(51) Int. Cl.
*H04W 4/38* (2018.01)
*G01S 7/00* (2006.01)
(Continued)

(52) U.S. Cl.
CPC .............. *H04W 4/38* (2018.02); *G01S 7/006* (2013.01); *G01S 13/865* (2013.01); *G01S 13/91* (2013.01); *H04W 72/04* (2013.01)

(58) Field of Classification Search
CPC ......... H04W 4/38; H04W 72/04; G01S 7/006; G01S 13/865; G01S 13/867; G01S 13/91; G01S 13/931
See application file for complete search history.

(56) References Cited

U.S. PATENT DOCUMENTS 6,615,137 B2 * 9/2003 Lutter .............. G08G 1/162
340/436
2012/0310599 A1 * 12/2012 Tanaka .............. A01B 79/005
702/189
(Continued)

FOREIGN PATENT DOCUMENTS

| CN | 114022860 A | 2/2022 |
| KR | 20160144666 A | 12/2016 |
| WO | 2022081624 A1 | 4/2022 |

OTHER PUBLICATIONS

ETRI. "Pre-crash sensing warning updates for V2V unicast communication" 3GPP TSG-SA WGJ Meeting #71 S1-152255, Aug. 21, 2015 (Aug. 21, 2015). the whole document.
(Continued)

*Primary Examiner* — Peter M Bythrow
(74) *Attorney, Agent, or Firm* — Robert P. Michal, Esq.; Carter, DeLuca & Farrell LLP

(57) ABSTRACT

Example embodiments of the present disclosure relate to sensing a dynamic area on request. In an example method, a core network device receives a sensing request from a terminal device. The sensing request indicates an initial sensing area and a change tendency of the initial sensing area. The core network device transmits a sensing instruction to an access network device. The sensing instruction instructs the access network device to sense a target sensing area determined based on the initial sensing area and the change tendency. The core network device receives a sensing result of the target sensing area from the access network device. The core network device transmits a sensing response to the terminal device. The sensing response is determined based on the sensing result. In this way, resource utilization efficiency of sensing of a network device is improved and impact on communication performance of the network device is reduced.

1 Claim, 16 Drawing Sheets

(51) Int. Cl.
*G01S 13/86* (2006.01)
*G01S 13/91* (2006.01)
*H04W 72/04* (2023.01)

(56) References Cited

U.S. PATENT DOCUMENTS

| | | | | |
|---|---|---|---|---|
| 2014/0009275 | A1* | 1/2014 | Bowers | G06Q 20/145 |
| | | | | 340/436 |
| 2014/0009307 | A1* | 1/2014 | Bowers | G08G 1/166 |
| | | | | 340/901 |
| 2017/0247036 | A1 | 8/2017 | Halder et al. | |
| 2018/0218607 | A1* | 8/2018 | Baghel | G08G 1/162 |
| 2018/0220279 | A1* | 8/2018 | Jung | H04L 67/12 |
| 2020/0084278 | A1* | 3/2020 | Cheng | H04W 4/44 |
| 2021/0258920 | A1* | 8/2021 | Baghel | H04W 76/27 |
| 2022/0155435 | A1* | 5/2022 | Bayesteh | G01S 13/88 |
| 2023/0086144 | A1* | 3/2023 | Roy | H04W 74/0808 |
| | | | | 370/329 |
| 2023/0142299 | A1* | 5/2023 | Pan | G01S 13/931 |
| | | | | 701/301 |
| 2023/0146061 | A1* | 5/2023 | Kassir | H04W 24/10 |
| | | | | 342/59 |
| 2023/0324541 | A1* | 10/2023 | Zorgui | H04W 4/38 |
| | | | | 455/456.1 |

OTHER PUBLICATIONS

International Search Report issued by the National Intellectual Property Administration, PRC acting as the International Searching Authority in relation to International Application No. PCT/CN2022/097240 dated Dec. 28, 2022 (3 pages).

Written Opinion of the International Searching Authority issued by the National Intellectual Property Administration, PRC acting as the International Searching Authority in relation to International Application No. PCT/CN2022/097240 dated Dec. 28, 2022 (3 pages).

* cited by examiner

ON-DEMAND SENSING OF DYNAMIC SENSING AREA

CROSS-REFERENCE TO RELATED APPLICATIONS

This application is a national phase entry under 35 U.S.C. 371 of PCT International Application No. PCT/CN2022/097240 filed Jun. 6, 2022, the disclosure of this application is expressly incorporated herein by reference in its entirety.

FIELD

Example embodiments of the present disclosure generally relate to the field of telecommunication, and in particular, to a core network device, a terminal device, an access network device, methods, apparatuses and a computer readable storage medium for sensing a dynamic area by an access network device configured by a core network device as per a request by a terminal device.

BACKGROUND

Joint Communication and Sensing (JCAS) is one of the major topics for 6G. There have been proposals submitted to 3rd Generation Partnership Project (3GPP) on JCAS. For example, several companies have proposed a new study item in 3GPP Service and System Aspects Working Group 2 (SA2) about architecture enhancements for Harmonized Communication and Sensing service. In European 6G flagship project Hexa-X, a demonstration is designed to showcase the potential for JCAS allowing for abundant cost-effective sensing by re-using existing hardware and infrastructure.

Currently, most JCAS solutions integrate radar sensing into communication systems. For example, sensing radar of an access network device (for example, a base station) can scan its coverage scope to measure distances and velocities of moving objects, such as persons, vehicles, robots, or the like. In Nokia white paper "Joint design of communication and sensing for beyond 5G and 6G systems," the relationships between system resources and sensing performances are discussed. For example, the system resources may include space resources, time resources, frequency resources, power resources, equivalent isotropically radiated power (EIRP) resources or the like, and the sensing performances can include the volume coverage, the coverage rate, the maximum velocity, the detection range, the velocity resolution, the range resolution, and so on. However, how to reasonably utilize the sensing capability of a communication system needs to be further studied.

SUMMARY

In general, example embodiments of the present disclosure provide a solution for sensing a dynamic area on request.

In a first aspect, there is provided a core network device. The core network device comprises a processor and a transceiver communicatively coupled to the processor. The processor is configured to cause the core network device to: receive, from a terminal device, a sensing request indicating an initial sensing area and a change tendency of the initial sensing area; transmit, to an access network device, a sensing instruction to sense a target sensing area determined based on the initial sensing area and the change tendency; receive a sensing result of the target sensing area from the access network device; and transmit, to the terminal device, a sensing response determined based on the sensing result.

In a second aspect, there is provided a terminal device. The terminal device comprises a processor and a transceiver communicatively coupled to the processor. The processor is configured to cause the terminal device to: determine an initial sensing area and a change tendency of the initial sensing area; transmit, to a core network device, a sensing request indicating the initial sensing area and the change tendency; and receive, from the core network device, a sensing response associated with a target sensing area determined based on the initial sensing area and the change tendency.

In a third aspect, there is provided an access network device. The access network device comprises a processor and a transceiver communicatively coupled to the processor. The processor is configured to cause the access network device to: receive, from a core network device, a sensing instruction to sense a target sensing area determined based on an initial sensing area associated with a terminal device and a change tendency of the initial sensing area; obtain a sensing result by sensing the target sensing area using a sensor of the access network device; and transmit the sensing result to the core network device.

In a fourth aspect, there is provided a method performed by a core network device. The method comprises: receiving, from a terminal device, a sensing request indicating an initial sensing area and a change tendency of the initial sensing area; transmitting, to an access network device, a sensing instruction to sense a target sensing area determined based on the initial sensing area and the change tendency; receiving a sensing result of the target sensing area from the access network device; and transmitting, to the terminal device, a sensing response determined based on the sensing result.

In a fifth aspect, there is provided a method performed by a terminal device. The method comprises: determining an initial sensing area and a change tendency of the initial sensing area; transmitting, to a core network device, a sensing request indicating the initial sensing area and the change tendency; and receiving, from the core network device, a sensing response associated with a target sensing area determined based on the initial sensing area and the change tendency.

In a sixth aspect, there is provided a method performed by an access network device. The method comprises: receiving, from a core network device, a sensing instruction to sense a target sensing area determined based on an initial sensing area associated with a terminal device and a change tendency of the initial sensing area; obtaining a sensing result by sensing the target sensing area using a sensor of the access network device; and transmitting the sensing result to the core network device.

In a seventh aspect, there is provided an apparatus. The apparatus comprises: means for receiving, at a core network device and from a terminal device, a sensing request indicating an initial sensing area and a change tendency of the initial sensing area; means for transmitting, to an access network device, a sensing instruction to sense a target sensing area determined based on the initial sensing area and the change tendency; means for receiving a sensing result of the target sensing area from the access network device; and means for transmitting, to the terminal device, a sensing response determined based on the sensing result.

In an eighth aspect, there is provided an apparatus. The apparatus comprises: means for determining, at a terminal device, an initial sensing area and a change tendency of the initial sensing area; means for transmitting, to a core network device, a sensing request indicating the initial sensing area and the change tendency; and means for receiving, from the core network device, a sensing response associated with a target sensing area determined based on the initial sensing area and the change tendency.

In a ninth aspect, there is provided an apparatus. The apparatus comprises: means for receiving, at an access network device and from a core network device, a sensing instruction to sense a target sensing area determined based on an initial sensing area associated with a terminal device and a change tendency of the initial sensing area; means for obtaining a sensing result by sensing the target sensing area using a sensor of the access network device; and means for transmitting the sensing result to the core network device.

In a tenth aspect, there is provided a core network device. The core network device comprises at least one processor and at least one memory storing computer program codes. The at least one memory and the computer program codes are configured to, with the at least one processor, cause the core network device to perform the method in the fourth aspect.

In an eleventh aspect, there is provided a terminal device. The terminal device comprises at least one processor and at least one memory storing computer program codes. The at least one memory and the computer program codes are configured to, with the at least one processor, cause the terminal device to perform the method in the fifth aspect.

In a twelfth aspect, there is provided an access network device. The access network device comprises at least one processor and at least one memory storing computer program codes. The at least one memory and the computer program codes are configured to, with the at least one processor, cause the access network device to perform the method in the sixth aspect.

In a thirteenth aspect, there is provided a non-transitory computer readable medium comprising program instructions for causing an apparatus to perform at least the method in the fourth, fifth and sixth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Figure 1:
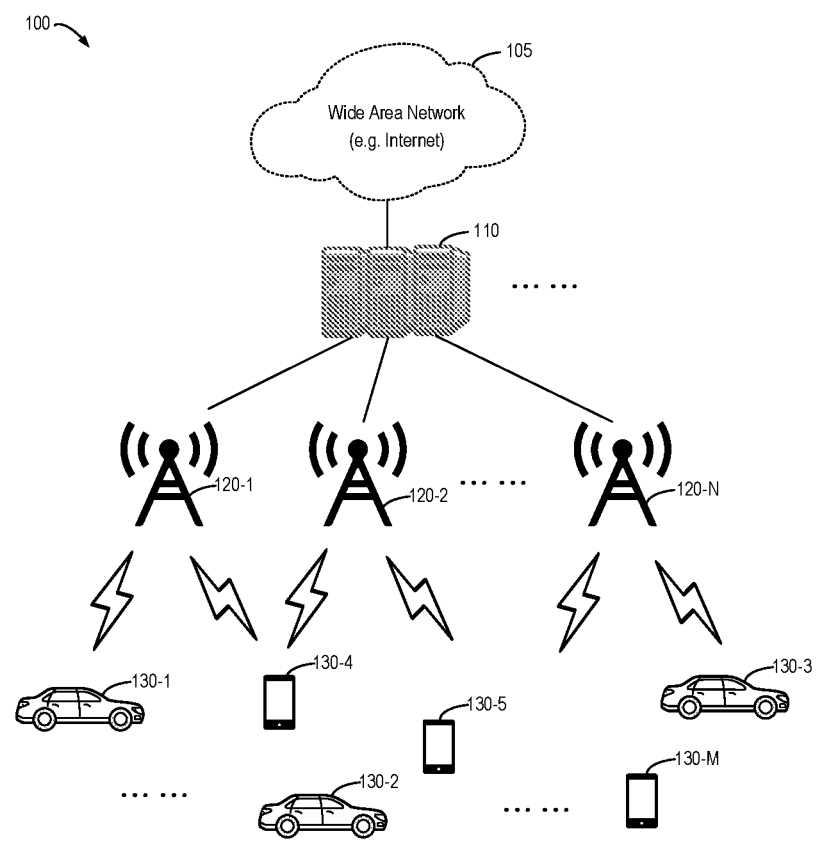
FIG. 1 illustrates an example of a network environment in which some example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Sensors, such as sensing radar, of a network device (for example, a base station) can sense moving objects in or near its coverage scope. For instance, such sensing capability of the network device may be used for assisting in various functions or applications of a terminal device, such as vehicle autopilot or assisted driving. In this regard, when and where to use the sensing capability of the network device is an important problem, as it needs to balance radio resource utilization against sensing performance. For example, considering a scenario of vehicle autopilot or assisted driving, if no vehicles pass an intersection, a sensor of a network device scanning the intersection may waste radio resources and power. On the other hand, a current terminal device (such as a vehicle) also installs many sensors, such as cameras, LIDARs, SODARs, radar, and so on. These sensors can sense those static or moving objects around the terminal device to support the functions or applications of the terminal device, such as autopilot or assisted driving.

Certainly, if more resources are allocated for the sensing capability (for example, the sensing radar) of the network device, higher sensing performance can be obtained. But apparently, allocating more resources to the sensing capability of the network device may impact communication performance of the network device, because sensing capability occupies more resources and fewer resources can be used to the normal communications of the network device. Therefore, how to reasonably utilize sensing capability of a network device needs to be further studied. More specifically, how to efficiently utilize sensing capability of a network device with no or low impact on performance of normal communications of the network device needs to be solved.

The inventor finds that for those areas that can be scanned by a sensor of a terminal device, such as a vehicle sensor, a sensor (for example, sensing radar) of a network device rescanning these areas may be unnecessary and also waste resources. In fact, for the sensor of the network device, only those blind spots of on-board sensors of the terminal device may be more important for the functions or applications of the terminal device, for example, the vehicle autopilot or assisted driving. If the sensor of the network device scans those blind spots for the terminal device based on a request by the terminal device, that is, on-demand sensing, resource utilization efficiency can be greatly improved. In this way, more resources can be saved for normal communications or more sensing resources can be allocated for sensing those blind spots to improve sensing performance.

Example embodiments of the present disclosure provide a mechanism to solve the above discussed issues, especially when to enable a sensor of a network device and which areas to be scanned by the sensor of the network device. The example embodiments of the present disclosure can improve resource utilization efficiency of sensing of the network device and also reduce impact on communication performance of the network device. Principles and some example embodiments of the present disclosure will be described in detail below with reference to the accompanying drawings.

FIG. 1 illustrates an example of a network environment 100 in which some example embodiments of the present disclosure may be implemented. In the descriptions of the example embodiments of the present disclosure, the network environment 100 may also be referred to as a communication system 100 (for example, a portion of a communication network). For illustrative purposes only, various aspects of example embodiments will be described in the context of one or more core network devices, access network devices, and terminal devices that communicate with one another. It should be appreciated, however, that the description herein may be applicable to other types of apparatus or other similar apparatuses that are referenced using other terminology.

The communication system 100 includes access network devices 120-1, 120-2 . . . , and 120-N (collectively referred to as access network devices 120), terminal devices 130-1, 130-2 . . . , and 130-M (collectively referred to as terminal devices 130), and a core network device 110. It is noted that either of the numbers M and N can be any suitable natural number. The access network devices 120 in the communication system 100 provide one or more services (for example, network connectivity) for one or more terminal devices 130 that may be installed within or that may roam throughout an associated geographical area. Therefore, the communications between one of the terminal devices 130 and the core network device 110 may be performed via one or more of the access network devices 120.

While only some of the terminal devices 130 are illustrated in FIG. 1, it is appreciated that any number of terminal devices or devices considered user equipment may be in communication with the access network devices 120. In addition, while FIG. 1 depicts the terminal devices 130-1, 130-3, and 130-5 as vehicles and the terminal devices 130-4, 130-5, and 130-M as mobile phones, the terminal devices 130 may be any type of user equipment. It is noted that in the following descriptions, if a terminal device (for example, the terminal device 130-1) is associated with a vehicle, then the term "the terminal device 130-1" and the term "the vehicle 130-1" may be used interchangeably to refer to the terminal device 130-1 when there is no misunderstanding caused thereby. In this regard, it is further noted that a vehicle may also be referred to as a terminal device in some example embodiments of the present disclosure. Further, the access network devices 120 may communicate with the core network device 110 or more core network devices to facilitate wide area network connectivity through a wide area network 105 (for example, Internet). Such a core network device 110 may take various forms. For example, the core network device 110 may comprise a location management function or some other suitable network entity, for example, a core network entity described in various example embodiments of the present disclosure, such as a sensing network function (SFN).

The wide area network 105 may comprise any type of electronically connected group of computers and/or devices including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1). Note that computing devices (for example, terminal devices 130) may be desktop, server, portable, handheld, set-top, or any other desired type of configuration. As used herein, the wide area network 105 includes network variations such as the public Internet, a private network within the Internet, a secure network within the Internet, a private network, a public network, a value-added network, an intranet, and the like. In certain embodiments, wide area network 105 may also comprise a virtual private network (VPN).

In some example embodiments, the terminal devices 130 may also communicate directly with one another over a sidelink interface. The sidelink interface may alternatively be referred to as a ProSe interface, device-to-device (D2D) interface, or a PC5 interface or reference point. In some example embodiments, the network environment 100 may be deployed within a vehicular communication system. In a vehicular communication system, the terminal device 130 may communicate with one another using cellular vehicle-to-everything (V2X) communications. V2X may involve vehicle-to-vehicle (V2V), vehicle-to-infrastructure (V2I), vehicle-to-network (VTN), or vehicle-to-pedestrian (V2P) communications.

Communications in the network environment 100 may be implemented according to any proper communication protocol(s), comprising, but not limited to, cellular communication protocols of the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

FIGS. 2A to 2E further illustrate some example environments in which some example embodiments of the present disclosure may be implemented. In these example environments, one of the terminal devices 130 (for example, the terminal device 130-1) in FIG. 1 is depicted as a vehicle, and one of the access network devices 120 (for example, the access network device 120-1) in FIG. 1 is depicted as a base station. However, it is to be understood that these depictions are only for the purpose of illustration without suggesting any limitations. It is also to be appreciated that any graphic elements, numerical values, and descriptive text in these figures are only for the purpose of illustration without suggesting any limitations.

Figure 2A:
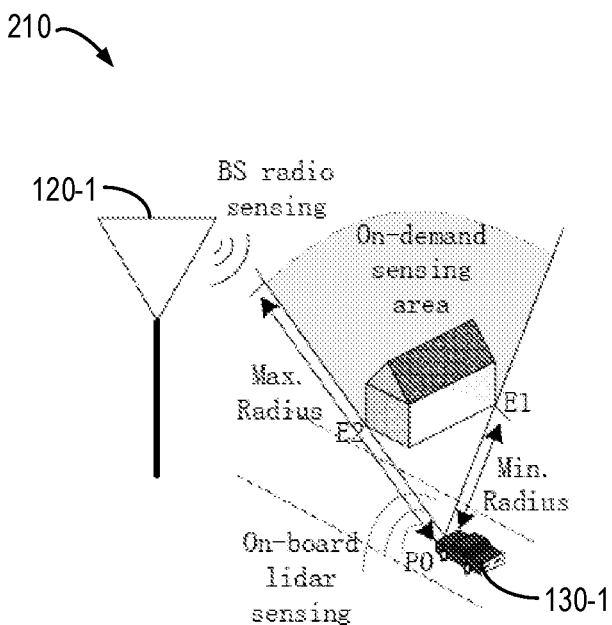
FIG. 2A illustrates an example environment of an on-demand sensing area in some example embodiments of the present disclosure.

FIG. 2A illustrates an example environment 210 of an on-demand sensing area in some example embodiments of the present disclosure. In the example environment 210, the terminal device or vehicle 130-1 is travelling on a road, and there is an obstruction (for example, a house) on the roadside. An on-board LIDAR of the vehicle 130-1 cannot sense a hidden area behind the obstruction. Therefore, at a particular time point, the vehicle 130-1 may determine an on-demand sensing area as a sector area defined based on a position P0 of the vehicle 130-1, edge points E1 and E2 of a contour of the obstruction, a lower radius and an upper radius of the sector area. The vehicle 130-1 can request the network side to configure the access network device 120-1 to sense the on-demand sensing area, so as to assist in the autopilot or driving of the vehicle 130-1.

Figure 2B:
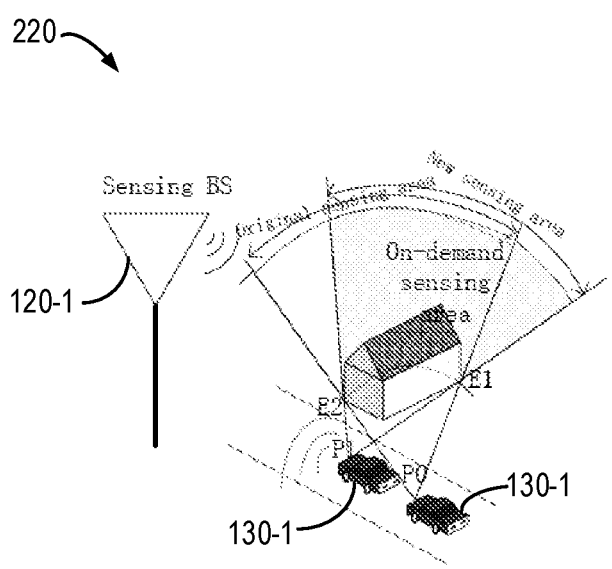
FIG. 2B illustrates an example environment of an on-demand dynamic sensing area in case of a static obstruction in some example embodiments of the present disclosure.

FIG. 2B illustrates an example environment 220 of an on-demand dynamic sensing area in case of a static obstruction in some example embodiments of the present disclosure. In the example environment 220, the terminal device or vehicle 130-1 is travelling on a road, and there is a static obstruction (for example, a house) on the roadside. The on-board LIDAR of the vehicle 130-1 cannot sense a hidden area behind the static obstruction. Different from the example environment 210, the example environment 220 shows that the on-demand sensing area is changing along with the movement of the vehicle 130-1. Therefore, at a first time point, the vehicle 130-1 may determine the on-demand sensing area as a first sector area (the original sensing area) defined based on a first position P0 of the vehicle 130-1, edge points E1 and E2 of the contour of the obstruction, a lower radius and an upper radius of the first sector area. At a second time point, the vehicle 130-1 may determine the on-demand sensing area as a second sector area (the new sensing area) defined based on a second position Pl of the vehicle 130-1, the edge points E1 and E2 of the contour of the obstruction, a lower radius and an upper radius of the second sector area. The vehicle 130-1 can request the network side to configure the access network device 120-1 to sense the dynamic sensing area, so as to assist in the autopilot or driving of the vehicle 130-1.

Figure 2C:
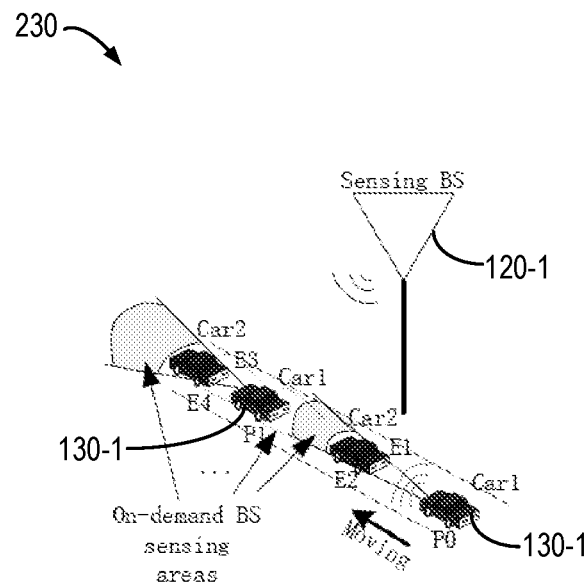
FIG. 2C illustrates an example environment of an on-demand dynamic sensing area in case of a moving obstruction in some example embodiments of the present disclosure.

FIG. 2C illustrates an example environment 230 of an on-demand dynamic sensing area in case of a moving obstruction in some example embodiments of the present disclosure. In the example environment 230, the terminal device or vehicle 130-1 (shown as car1) is travelling on a road. Different from the example environment 220, the example environment 230 shows that the on-demand sensing area is changing with a moving obstruction, for example, another vehicle (shown as car2). The on-board LIDAR of the vehicle 130-1 cannot sense a hidden area behind the moving obstruction. Therefore, at a first time point, the vehicle 130-1 may determine the on-demand sensing area as a first area based on a first position P0 of the vehicle 130-1 and a position E2 of the moving obstruction. At a second time point, the vehicle 130-1 may determine the on-demand sensing area as a second area based on a second position P1 of the vehicle 130-1 and a position E4 of the moving obstruction. Therefore, the on-demand dynamic sensing area may change along with the movements of the two vehicles. The vehicle 130-1 can request the network side to configure the access network device 120-1 to sense the dynamic sensing area, so as to assist in the autopilot or driving of the vehicle 130-1. For example, the terminal device 130-1 can provide some relative motion parameters for updating the dynamic sensing area, such as the velocity of the moving obstruction relative to the vehicle 130-1, the acceleration of the moving obstruction relative to vehicle 130-1, the yaw of the moving obstruction relative to vehicle 130-1, or the like.

Figure 2D:
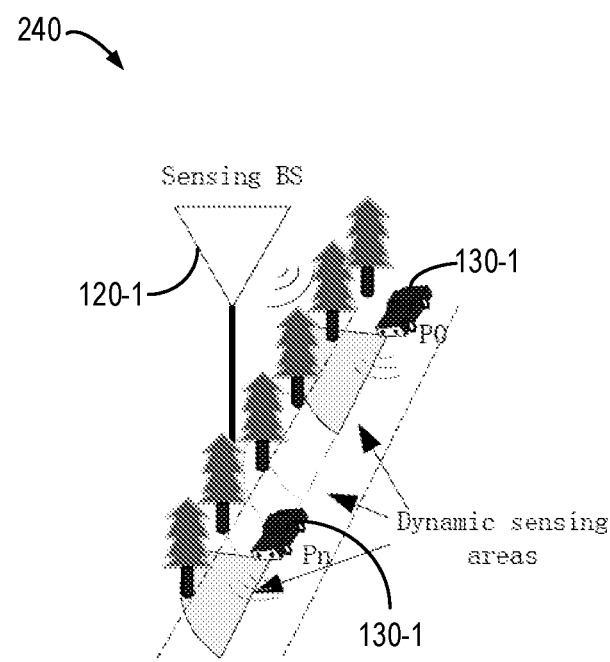
FIG. 2D illustrates an example environment of an on-demand dynamic sensing area with a constant size in some example embodiments of the present disclosure.

FIG. 2D illustrates an example environment 240 of an on-demand dynamic sensing area with a constant size in some example embodiments of the present disclosure. In the example environment 240, the terminal device or vehicle 130-1 is travelling on a road, and there are obstructions (for example, a line of trees) on the roadside. An on-board LIDAR of the vehicle 130-1 cannot sense hidden areas behind the obstructions. Different from the previous example environments, in the example environment 240, the on-demand sensing area is changing along with the movement of the vehicle 130-1, but the size of the on-demand sensing area is constant. Therefore, the vehicle 130-1 may determine the on-demand sensing area based on the motion information of the vehicle 130-1 and positions of the obstructions. The vehicle 130-1 can request the network side to configure the access network device 120-1 to sense the on-demand sensing areas, so as to assist in the autopilot or driving of the vehicle 130-1. For example, the vehicle 130-1 may request the network side to sense its right front area of a constant size.

Figure 2E:
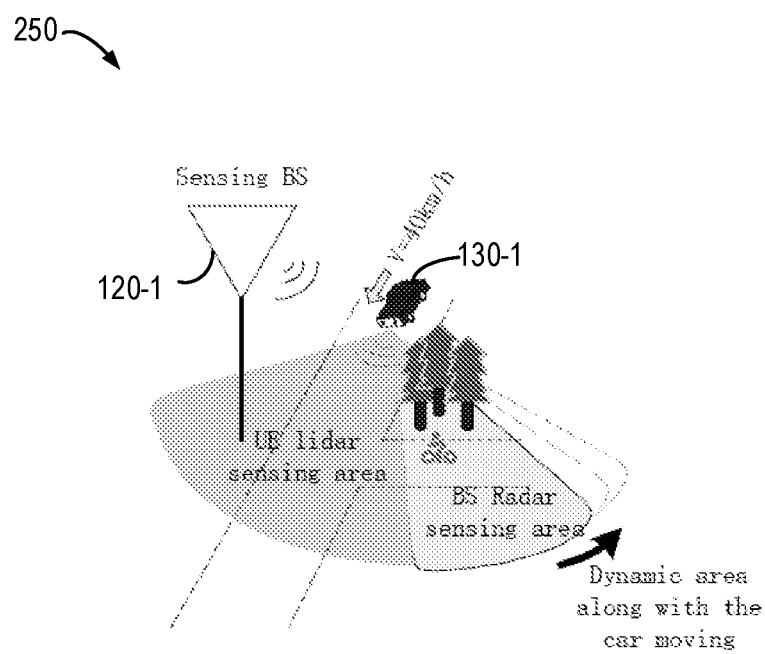
FIG. 2E illustrates an example environment of an on-demand dynamic sensing scenario in which some example embodiments of the present disclosure may be implemented.

FIG. 2E illustrates an example environment 250 of an on-demand dynamic sensing in which some example embodiments of the present disclosure may be implemented. In the example environment 250, the terminal device or vehicle 130-1 is travelling on a road, and there are obstructions (for example, trees) on the roadside. The on-board LIDAR of the vehicle 130-1 cannot sense a hidden area behind the obstructions. Therefore, the vehicle 130-1 may determine an on-demand sensing area defined based on the motion information of the vehicle 130-1 and positions of the obstructions. The vehicle 130-1 can request the network side to configure the access network device 120-1 to sense the on-demand sensing area, so as to assist in the autopilot or driving of the vehicle 130-1. For example, the vehicle 130-1 may request the network side to sense blind spots behind the trees to avoid a collision with a cyclist in the blind spots. It is noted that the blind spots are changing along with the movement of the vehicle 130-1.

Figure 3:
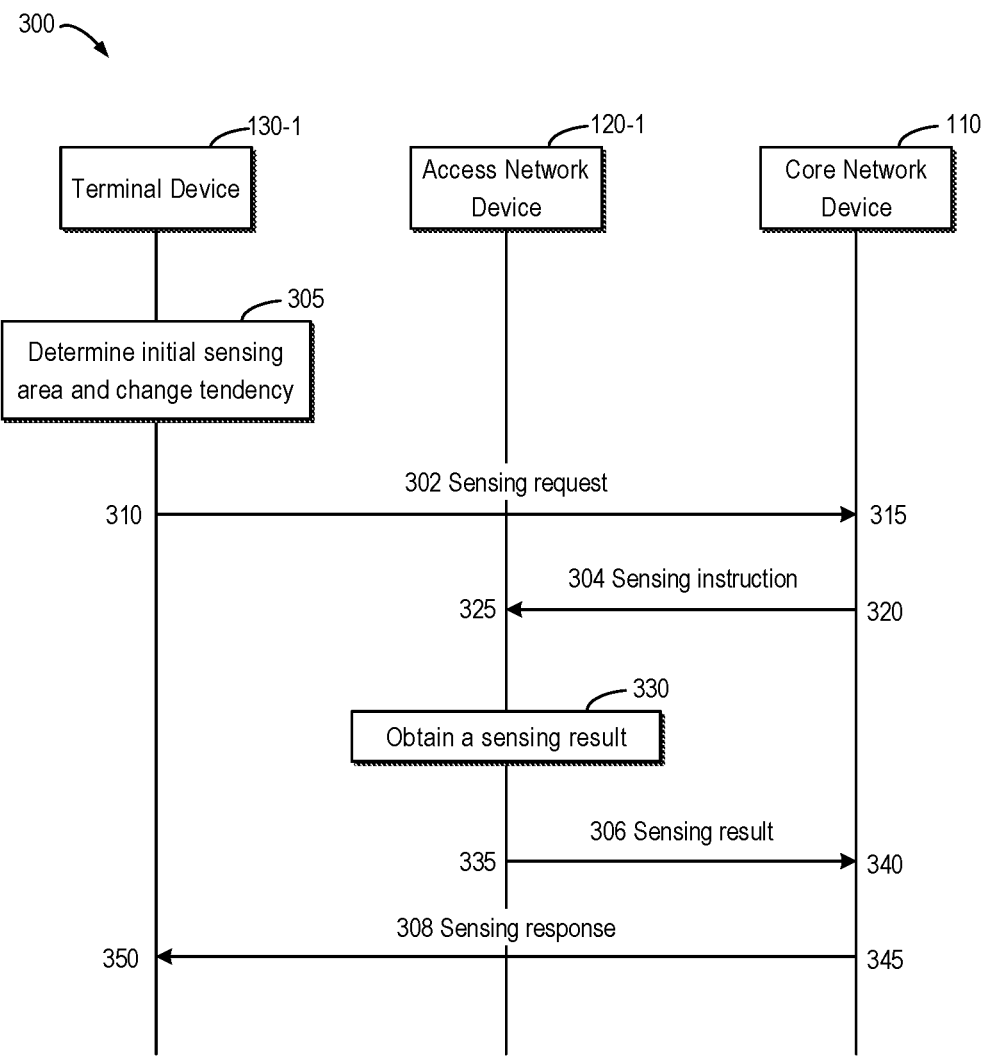
FIG. 3 illustrates an example of a process flow for sensing a dynamic sensing area by an access network device instructed by a core network device based on a request by a terminal device in accordance with some example embodiments of the present disclosure.

FIG. 3 illustrates an example of a process flow 300 for sensing a dynamic sensing area by the access network device 120-1 instructed by the core network device 110 based on a request by the terminal device 130-1 in accordance with some example embodiments of the present disclosure. For the purpose of discussion, the process flow 300 will be described with reference to FIG. 1. It would be appreciated that although the process flow 300 has been described referring to the network environment 100 of FIG. 1, this process flow 300 may be likewise applied to other similar communication scenarios.

In the process flow 300, the terminal device 130-1 determines (305) an initial sensing area and a change tendency of the initial sensing area. Without loss of generality, the initial sensing area determined by the terminal device 130-1 may be any area which needs to be sensed by the terminal device 130-1. However, in most cases, the initial sensing area may be an area undetectable by the terminal device 130-1. In other words, a sensor (for example, a LIDAR of a vehicle, a camera, a sonar, or the like) associated with the terminal device 130-1 cannot sense the initial sensing area for some reasons. For example, the initial sensing area may be a blind spot of a user of the terminal device 130-1, an area out of sight of the user of the terminal device 130-1, an area unable to be sensed by a sensor associated with the terminal device 130-1, an area behind an obstruction (for example, roadside trees, roadside houses, roadside stopped vehicles, or other moving vehicles around the terminal device 130-1), a roadside area lower than a road surface, and a blind spot inherent in a vehicle associated with the terminal device 130-1 (for example, an A-pillar blind spot), or any combination thereof. As such, various areas that cannot be sensed by the terminal device 130-1 can be determined as the initial sensing area, so as to improving the performance of the functions or applications of the terminal device 130-1. such as vehicle autopilot or assisted driving. In some example embodiments, the terminal device 130-1 can generate the initial sensing area via its on-board LIDAR.

In practice, in order to determine the initial sensing area, the terminal device 130-1 can determine geometry information of the initial sensing area. For example, in the example environments shown in FIGS. 2A and 2B, the terminal device 130-1 may determine a current position of the terminal device 130-1, edge points of a contour of an obstruction, a lower sensing radius of the initial sensing area, and an upper sensing radius of the initial sensing area. As such, the geometry of the initial sensing area can be described in an efficient and effective manner. For instance, the initial sensing area is often a sector area determined based on these geometry parameters. As shown in FIGS. 2A and 2B, the sector area is surrounded by two half-lines, the lower radius and the upper radius. As an example, the lower radius can be determined by the distance between the terminal device 130-1 and the obstruction. As another example, the upper radius may be determined by the view scope that the terminal device 130-1 needs to sense.

As described above with reference to FIGS. 2A to 2E, when the terminal device 130-1 is moving, the on-demand sensing area can be a dynamic area which may be continuously changing with the movement of the terminal device 130-1 or the movement of the obstruction. Accordingly, in addition to the initial sensing area, the terminal device 130-1 may need to determine the change tendency of the initial sensing area, so that the on-demand sensing area may be determined based on the initial sensing area and the change tendency. Therefore, the terminal device 130-1 can indicate the on-demand dynamic sensing area to the network side using the initial sensing area and the change tendency.

In general, the change tendency of the initial sensing area can be represented by any suitable manner. For example, the terminal device 130-1 may employ a mathematical function over time to represent the change tendency of the initial sensing area, and thus determine the change tendency by determining the mathematical function. In another example, in determining the change tendency, the terminal device 130-1 can determine a current position (for example, in an earth coordination system) of the terminal device 130-1, motion information of the terminal device 130-1, motion information (for example, in a coordination system of the terminal device 130-1) of a moving obstruction associated with the initial sensing area relative to the terminal device 130-1, or any combination of thereof. As such, the change tendency of the initial sensing area can be described in an efficient and effective manner. In some embodiments, the motion information of the terminal device 130-1 may include the velocity, the acceleration, the yaw or the like of the terminal device 130-1 in the earth coordination system. The motion information of the moving obstruction may include the velocity, the acceleration, the yaw or the like of the moving obstruction in a current coordination system of the terminal device 130.

Continuing with reference to FIG. 3, after determining the initial sensing area and the change tendency, the terminal device 130-1 transmits (310) a sensing request 302 to the core network device 110. The sensing request 302 indicates the initial sensing area and the change tendency determined by the terminal device 130-1. In general, the sensing request 302 may contain any suitable information for indicating the initial sensing area. For example, the sensing request 302 may include some geometry parameters to describe the initial sensing area, such as the current position of the terminal device 130-1, the edge points of the contour of the obstruction associated with the initial sensing area, the lower sensing radius of the initial sensing area, the upper sensing radius of the initial sensing area, or any combination thereof.

Similarly, in general, the sensing request 302 may contain any suitable information for indicating the change tendency. For example, the sensing request 302 may include some motion parameters to describe the change tendency, such as the current position of the terminal device 130-1, the motion information of the terminal device 130-1, and the motion information of the moving obstruction relative to the terminal device 130-1. In some embodiments, the motion information of the terminal device 130-1 may include the velocity, the acceleration, the yaw or the like of the terminal device 130-1 in the earth coordination system. The motion information of the moving obstruction may include the velocity, the acceleration, the yaw or the like of the moving obstruction in a current coordination system of the terminal device 130.

In some example embodiments, the sensing request 302 may further include some other information for facilitating the sensing of the dynamic area on request. For instance, the sensing request 302 can contain semantic information of the obstruction associated with the initial sensing area, an identifier of the initial sensing area, an identifier of the terminal device 130-1, or any combination thereof. As an example, the identifier of the initial sensing area can be an index number of the initial sensing area and the associated on-demand dynamic sensing area. The identifier of the initial sensing area may be used to identify the initial sensing area and the on-demand dynamic sensing area for later functions in the sensing of the dynamic area on request, such as releasing operations, obstruction semantic extraction for a risk analysis, and so on.

The identifier of the terminal device 130-1 can be used by the network side to identify the terminal device 130-1, since there may be multiple terminal devices to request on-demand sensing of respective dynamic areas. The semantic information of the obstruction can help the network side with the above mentioned semantic extraction. In addition, by means of the semantic information of the obstruction, the terminal device 130 can generate the initial sensing area based on a semantic analysis of the obstruction. For example, if the terminal device 130 determines that there is no risk in an area associated with the obstruction, the terminal device 130 may not transmit the sensing request 302 for the area to the core network device 110. Some more example embodiments in this regard will be further detailed hereinafter with reference to FIG. 8.

On the other side of the transmission, the core network device 110 receives (315) the sensing request 302 from the terminal device 130-1. Then, upon the request by the terminal device 130-1, the core network device 110 transmits (320) a sensing instruction 304 to the access network device 120-1. The sensing instruction 304 instructs the access network device 120-1 to sense a target sensing area determined based on the initial sensing area and the change tendency. As used herein, the initial sensing area may refer to an initial version of the dynamic area indicated by the terminal device 130-1, and the target sensing area can refer to a later version of the dynamic area after some time since the initial sensing area is determined by the terminal device 130-1. In some example embodiments, the sensing instruction 304 may be transmitted by a sensing network function (SNF) of the core network device 110.

For the dynamic area indicated in the sensing request 302, the core network device 110 may select one or more access network devices 120 to sense the dynamic area requested by the terminal device 130-1. For example, the core network device 110 can currently select only the access network device 120-1 to sense the requested dynamic area, and then instruct the access network device 120-1 to sense the target sensing area, which is a current version of the requested dynamic area. The reason may be that the terminal device 130-1 is now served by the access network device 120-1, or the target sensing area is within the coverage of the access network device 120-1 (or its sensor, such as sensing radar). In some other embodiments, the core network device can select one or more access network devices from multiple candidate access network devices, and then instruct the one or more selected access network devices to sense the target sensing area. In these example embodiments, the access network device 120-1 is one of the one or more selected access network devices. As such, the core network device 110 may determine better ones of the candidate access network devices to sense the requested dynamic area, so as to improve the sensing performance of the dynamic area.

On the receiving side, the access network device 120-1 receives (325) the sensing instruction 304 from the core network device 110. In some embodiments, the sensing instruction 304 may contain some information for facilitating the sensing of the target sensing area by the access network device 120-1. For example, the sensing instruction 304 may include either or both of resource allocation information and sensor configuration information. The resource allocation information can be used for allocating sensing resources to the access network device 120-1 for sensing the target sensing area. The sensor configuration information may be used for configuring a sensor of the access network device 120-1 to sense the target sensing area. For instance, the sensor of the access network device 120-1 may be BS radar or any other suitable sensor. As such, the sensing instruction 304 can configure the access network device 120-1 to sense the target sensing area in an advantageous manner, so as to improve the sensing performance of the target sensing area.

In the example embodiments in which the SNF of the core network device 110 transmits the sensing instruction 304, after one or more access network devices are selected for sensing the requested dynamic area, the SNF of the core network device 110 may allocate time resources, frequency resources, space resources, power resources, or the like for the selected access network devices according to the request from the terminal device 130-1. Then, the SNF of the core network device 110 may configure the sensors (such as BS radar and other suitable sensors) of the selected access network devices to perform the sensing of the requested dynamic area.

Accordingly, in some example embodiments, the access network device 120-1 can obtain the resource allocation information from the sensing instruction 304. Then, the access network device 120-1 may sense the target sensing area using the allocated sensing resources, such as time resources, frequency resources, space resources, power resources, or the like. Similarly, in some example embodiments, the access network device 120-1 may obtain the sensor configuration information from the sensing instruction 304. Afterwards, the access network device 120-1 can configure the sensor of the access network device 120-1 based on the sensor configuration information, so as to sense the target sensing area.

After receiving (325) the sensing instruction 304, the access network device 120-1 can perform the sensing of the target sensing area based on the received sensing instruction 304. In other words, the access network device 120-1 obtains (330) a sensing result 306 by sensing the target sensing area using the sensor of the access network device 120-1. Without loss of generality, the sensing result 306 may contain any information that is obtained by the access network device 120-1 and is useful to the terminal device 130-1. For example, the sensing result 306 can indicate all the objects hidden in the target sensing area, so that the core network device 110 may obtain more comprehensive information of the hidden objects.

In an example embodiment in which the terminal device 130-1 is a vehicle or associated with the vehicle, moving objects may be more important to the terminal device 130-1 because the moving objects may collide with the vehicle. In such an example embodiment, the sensing result 306 may contain an indication of a moving object in the target sensing area, a position of the moving object, motion information of the moving object, or any combination thereof. In this way, the sensing result 306 can indicate moving objects to the core network device 110 in an efficient and effective manner. In some other embodiments, the sensing result 306 can also contain an identifier of the target sensing area, which may also be the identifier of the on-demand dynamic area. In this manner, the interactive operations between the access network device 120-1 and the core network device 110 for the on-demand dynamic sensing can be facilitated.

Therefore, in obtaining the sensing result 306, the access network device 120-1 may determine an identifier of the moving object detected in the target sensing area. Alternatively or additionally, the access network device 120-1 may determine the position of the moving object. Alternatively or additionally, the access network device 120-1 may determine the motion information of the moving object relative to the terminal device 130-1. Alternatively or additionally, the access network device 120-1 may determine the identifier of the target sensing area.

As mentioned, since the on-demand area requested by the terminal device 130-1 can be dynamic, the target sensing area may already change when the access network device 120-1 receives (325) the sensing instruction 304 and is to continue changing over time. Therefore, in some example embodiments, in order to sense the target sensing area, the access network device 120-1 can obtain motion information related to the target sensing area from the sensing instruction 304. For example, the motion information related to the target sensing area may include motion information of the terminal device 130-1 and motion information of a moving obstruction relative to the terminal device 130-1. Then, the access network device 120-1 can track the target sensing area based on either or both of the motion information of the terminal device 130-1 and the motion information of the moving obstruction. In this way, the performance of the sensing of the target sensing area can be improved.

In a more specific example, sensing radar of the access network device 120-1 can be triggered and woken by the on-demand dynamic sensing request from the terminal device 130-1. Then, the sensing radar of the access network device 120-1 may sense and track those on-demand dynamic areas according to related motion parameters provided by the terminal device 130-1. As the sensing radar of the access network device 120-1 only needs to sense the on-demand sensing areas but not its whole coverage, various resources (such as time/frequency/space/power resources) can be saved. As a result, more resources can be allocated to these on-demand areas to obtain high sensing performance.

After obtaining (330) the sensing result 306, the access network device 120-1 transmits (335) the sensing result 306 of the target sensing area to the core network device 110. Accordingly, the core network device 110 receives (340) the sensing result 306 from the access network device 120-1. Afterwards, the core network device 110 transmits (345) a sensing response 308 to the terminal device 130-1, so as to report part or all of the sensing result 306 to the terminal device 130-1. In addition to the sensing result 306, the sensing response 308 may possibly contain other analysis results obtained by the core network device 110 to assist with the functions or applications of the terminal device 130-1, such as vehicle autopilot or assisted driving. Accordingly, the sensing response 308 is determined by the core network device 110 based on the sensing result 306.

In general, the core network device 110 can employ any suitable manner to generate the sensing response 308 based on the sensing result 306. For example, the core network device 110 may generate the sensing response 308 to include the sensing result 306. In other words, the sensing response 308 can contain the entirety of the sensing result 306. In such a manner, all the information obtained by the access network device 120-1 through the sensing can be provided to the terminal device 130-1, so that the terminal device 130-1 can obtain more comprehensive information of the target sensing area. In a more specific example, the sensing response 308 can list all moving objects and their motion states, including positons, velocities, accelerations, yaws or the like in an earth coordination system. In some example embodiments, the sensing response 308 may also include some necessary indication information, for example, an identifier (such as an index number) of the on-demand sensing area.

In some other example embodiments, the core network device 110 can generate the sensing response 308 to include relatively important part of the information contained the sensing result 306. For example, in an example embodiment in which the terminal device 130-1 is a vehicle or associated with the vehicle, the core network device 110 may generate the sensing response 308 to include some objects indicated in the sensing result 306 that are risky for the vehicle. Some example embodiments in this regard will be further detailed hereinafter with reference to FIG. 11.

As mentioned, the on-demand area requested by the terminal device 130-1 may be dynamic and thus the target sensing area may be continuously changing over time. Therefore, in order to ensure the access network device 120-1 to effectively and accurately sense the target sensing area, the core network device 110 may determine a sensing period for updating the target sensing area periodically. In this way, the target sensing area can be updated in time and the sensing performance of the on-demand dynamic area can be improved. For example, if the sensing period is set to be 1 second (1 s), then the core network device 110 can determine an updated target sensing area every second. In such an example, in transmitting (345) the sensing response 308 to the terminal device 130-1, the core network device 110 may transmit multiple sensing responses periodically based on the sensing period. The sensing response 308 is one of the multiple sensing responses. As such, the terminal device 130-1 can obtain more accurate and effective sensing report of the requested dynamic sensing area. In other words, if the sensing period is set to be 1 second (1 s), then the core network device 110 may transmit an updated sensing response every second. For instance, a sensing response can be sent to the terminal device 130-1 in each sensing period until the on-demand sensing area is released or replaced by a new request from the terminal device 130-1.

In some example embodiments, at an end point of the sensing period, the core network device 110 may update the target sensing area based on the target sensing area and the change tendency of the initial sensing area. That is, the updated target sensing area is determined based on the previous target sensing area and the change tendency. In this way, the core network device 110 can perform the updating of the target sensing area in an efficient and effective manner. It is noted that the current position of the terminal device 130-1 (for example, in an earth coordination system) may be a basic reference point during a whole sensing period.

After the target sensing area is updated, the core network device 110 may reselect one or more access network devices from the multiple candidate access network devices. The one or more reselected access network devices may be instructed by the core network device 110 to sense the updated target sensing area. As such, the core network device 110 may determine better ones of the candidate access network devices to sense the requested dynamic area, so as to improve the sensing performance of the dynamic area. Some example embodiments in this regard will be further detailed hereinafter with reference to FIG. 6. In a more specific example, the SNF of the core network device 110 can continuously calculate and generate new target sensing areas, for example, based on the configured sensing period or per 10 m displacement of the terminal device 130-1. Then, the SNF of the core network device 110 may reselect the access network devices and reconfigure the sensing radar of the reselected access network devices.

Continuing with reference to FIG. 3, the terminal device 130-1 receives (350) the sensing response 308 from the core network device 110. With the sensed information on the requested dynamic area contained in the sensing response 308, the functions or applications of the terminal device 130-1 can be performed more effectively, efficiently or safely. For example, if the terminal device 130-1 is a vehicle or associated with the vehicle, the autopilot or assisted driving performed by the terminal device 130-1 can be safer with the assistance of the sensing response 308. As discussed above, in some example embodiments, the core network device 110 may transmit multiple sensing responses periodically based on the sensing period. In these example embodiments, the terminal device 130-1 may receive the multiple sensing responses periodically. The sensing response 308 is one of the multiple sensing responses.

Through the process flow 300, an on-demand dynamic sensing area can be sensed by the access network device 120-1 configured by the core network device 110 based on a request by the terminal device 130-1, thereby improving resource utilization efficiency of the sensing performed by the access network device and also reducing impact on communication performance of the access network device.

Figure 4:
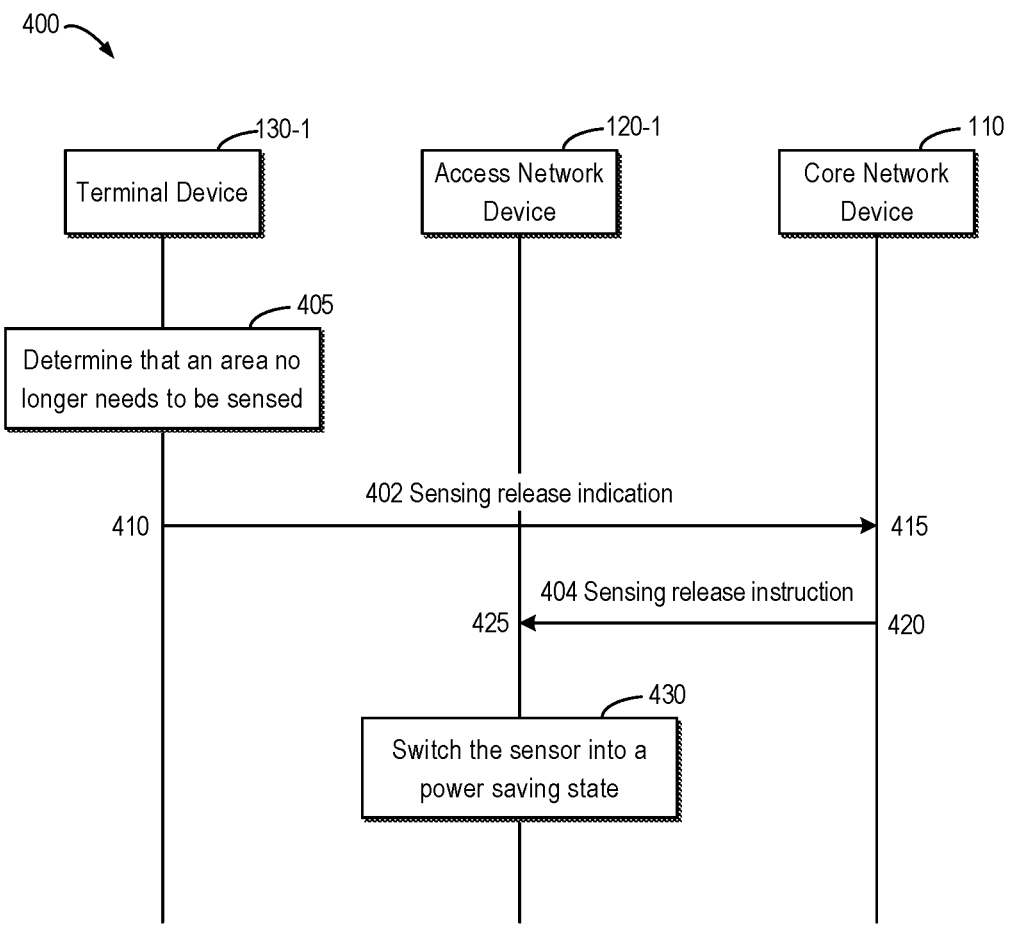
FIG. 4 illustrates an example of a process flow for releasing the sensing of a dynamic sensing area in accordance with some example embodiments of the present disclosure.

FIG. 4 illustrates an example of a process flow 400 for releasing the sensing of a dynamic sensing area in accordance with some example embodiments of the present disclosure. It is noted that the process flow 400 can be performed in combination with or in addition to the process flow 300. For the purpose of discussion, the process flow 400 will be described with reference to FIG. 1. It would be appreciated that although the process flow 400 has been described referring to the network environment 100 of FIG. 1, this process flow 400 may be likewise applied to other similar communication scenarios.

With reference to both FIGS. 3 and 4, it is assumed that the terminal device 130-1 already transmits the sensing request 302 to the core network device 110 to request the network side to sensing a dynamic sensing area. As mentioned, the sensing request 302 may include the initial sensing area and the change tendency of the initial sensing area. In the process flow 400, the terminal device 130-1 may determine (405) that an area determined based on the initial sensing area and the change tendency no longer needs to be sensed. For example, the terminal device 130-1 may stop and does not move for a period of time. As another example, the blind spot associated with the initial sensing area may disappear for some reasons. Then, the terminal device 130-1 can transmit (410) a sensing release indication 402 to the core network device 110. For example, the sensing release indication 402 can be sent to the SNF of the core network device 110.

Upon receiving (415) the sensing release indication 402 from the terminal device 130-1, the core network device 110 may transmit (420) a sensing release instruction 404 to release the sensing of the target sensing area to the access network device 120-1. Upon receiving (425) the sensing release instruction 404 from the core network device 110, the access network device 120-1 can switch (430) the sensor of the access network device 120-1 into a power saving state. In other words, if there is no on-demand sensing request from the terminal device 130-1, the sensor (for example, sensing radar) of the access network device 120-1 can stop sensing the target sensing area and come into a sleep state, until it is woken by a new on-demand sensing request from the terminal device 130-1.

Through the process flow 400, an area that the terminal device 130-1 does not need to sense any longer can be timely informed to the network side (for example, the core network device 110 and the access network device 120-1), thereby effectively saving the sensing resources of the network side that would otherwise be wasted in sensing the area.

Figure 5:
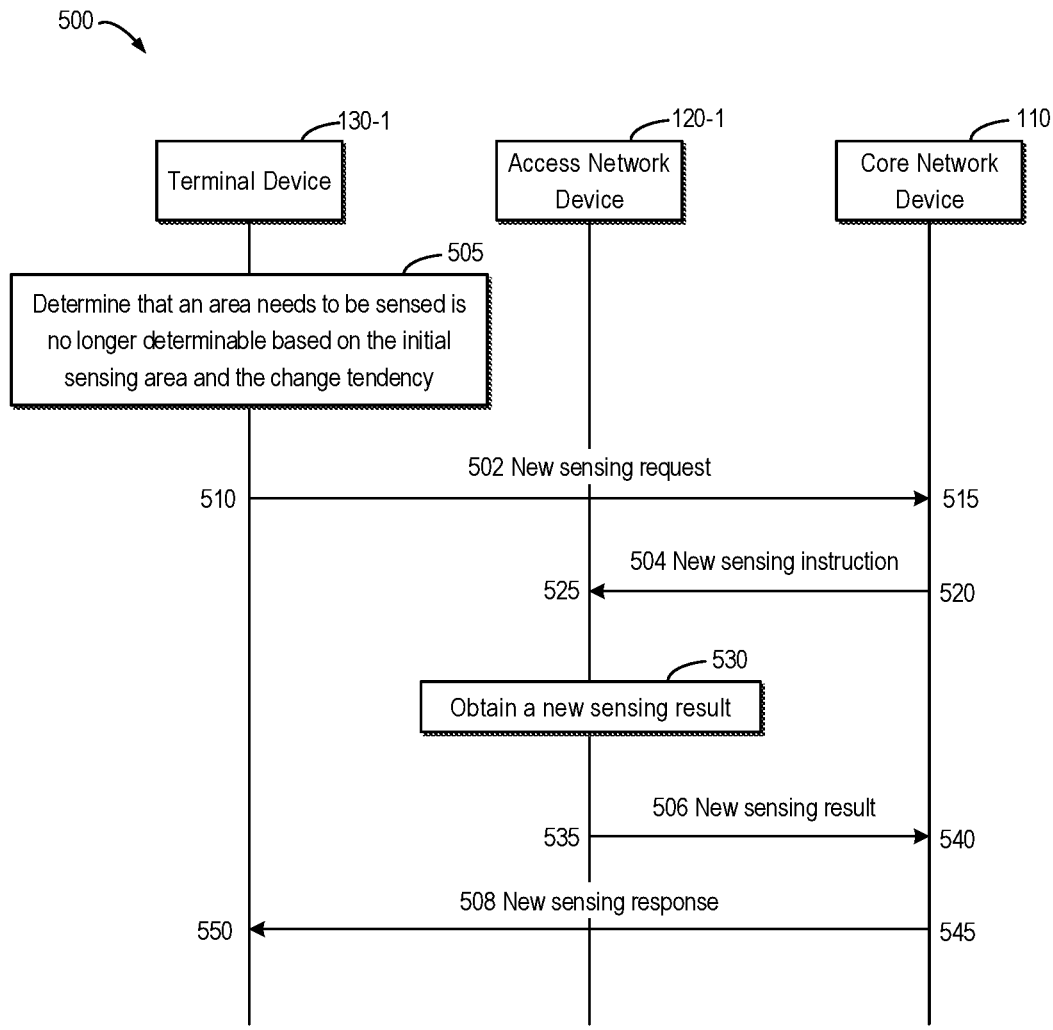
FIG. 5 illustrates an example of a process flow for sensing a new dynamic sensing area in accordance with some example embodiments of the present disclosure.

FIG. 5 illustrates an example of a process flow 500 for sensing a new dynamic sensing area in accordance with some example embodiments of the present disclosure. It is noted that the process flow 500 can be performed in combination with or in addition to the process flow 300. For the purpose of discussion, the process flow 500 will be described with reference to FIG. 1. It would be appreciated that although the process flow 500 has been described referring to the network environment 100 of FIG. 1, this process flow 500 may be likewise applied to other similar communication scenarios.

With reference to both FIGS. 3 and 5, it is assumed that the terminal device 130-1 already transmits the sensing request 302 to the core network device 110 to request the network side to sensing a dynamic sensing area. In the process flow 500, the terminal device 130-1 may determine (505) that an area (for example, the dynamic sensing area) needs to be sensed is no longer determinable based on the initial sensing area and the change tendency indicated in the sensing request 302. For example, due to the movement of the terminal device 130-1, the movement of an obstruction relative to the terminal device 130-1 or both of them, the dynamic sensing area that the terminal device 130-1 needs to be sensed cannot be determined based on the initial sensing area and the change tendency informed to the network side any more. Then, the terminal device 130-1 can determine a new initial sensing area and a new change tendency of the new initial sensing area in a similar way described with reference to FIG. 3.

Afterwards, the terminal device 130-1, the core network device 110, and the access network device 120-1 can interact with one another in an analogous manner to the process flow 300. For example, the terminal device 130-1 may transmit (510) a new sensing request 502 to the core network device 110. The new sensing request 502 may indicate the new initial sensing area and the new change tendency of the new initial sensing area. Accordingly, the core network device 110 may receive (515) the new sensing request 502 from the terminal device 110.

Afterwards, the core network device 110 may transmit (520) a new sensing instruction 504 to the access network device 120-1. The new sensing instruction 504 can instruct the access network device 120-1 to sense a new target sensing area determined based on the new initial sensing area and the new change tendency of the new initial sensing area. Therefore, the access network device 120-1 can receive (525) the new sensing instruction 504 from the core network device 110.

Next, the access network device 120-1 can obtain (530) a new sensing result 506. Then, the access network device 120-1 can transmit (535) the new sensing result 506 to the core network device 110. On the receiving side, the core network device 110 can receive (540) the new sensing result 506 from the access network device 120-1. After that, the core network device 110 may transmit (545) a new sensing response 508 to the terminal device 130-1. The new sensing response 508 may be determined by the core network device 110 based on the new sensing result 506. The terminal device 130-1 can receive (550) the new sensing response 508 from the core network device 110.

Through the process flow 500, the sensing of the new target sensing area indicated in the new sensing request can be performed in an efficient and effective manner, thereby improving the sensing performance of the sensing of the new target sensing area.

Figure 6:
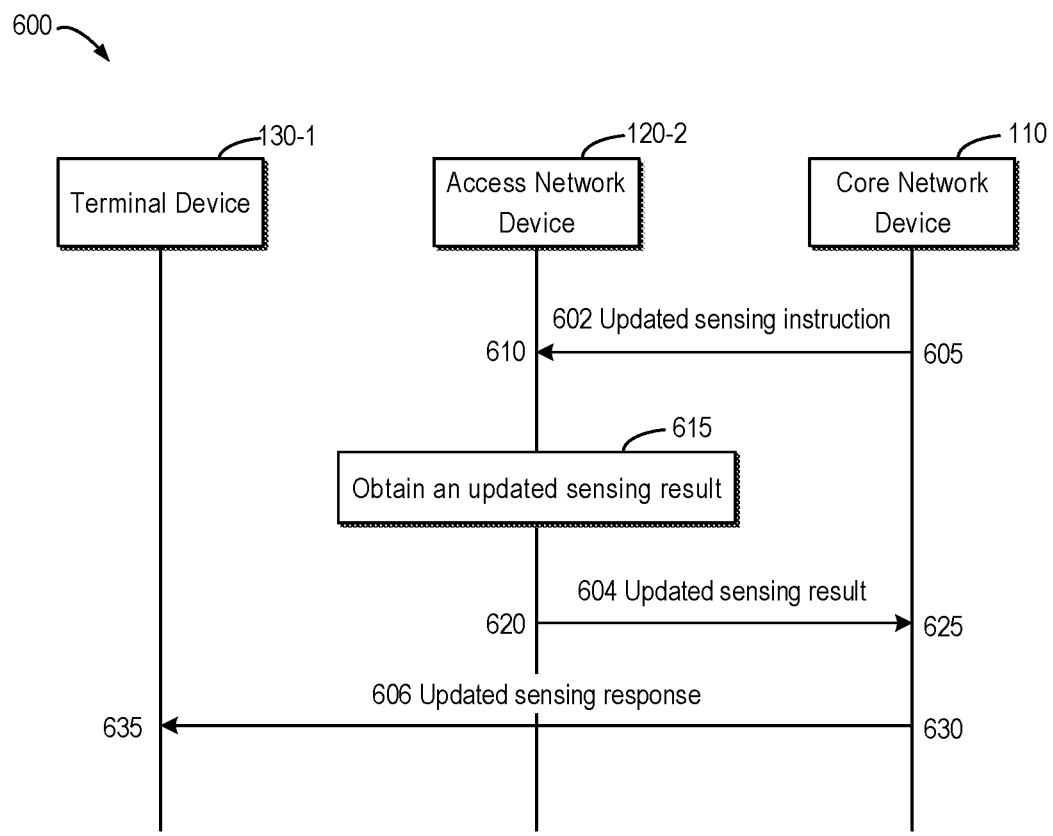
FIG. 6 illustrates an example of a process flow for sensing an updated target sensing area in accordance with some example embodiments of the present disclosure.

FIG. 6 illustrates an example of a process flow 600 for sensing an updated target sensing area in accordance with some example embodiments of the present disclosure. It is noted that the process flow 600 can be performed in combination with or in addition to the process flow 300. For the purpose of discussion, the process flow 600 will be described with reference to FIG. 1. It would be appreciated that although the process flow 600 has been described referring to the network environment 100 of FIG. 1, this process flow 600 may be likewise applied to other similar communication scenarios.

With reference to both FIGS. 3 and 6, it is assumed that the core network device 110 already transmits the sensing instruction 304 to the access network device 120-1. The sensing instruction 304 instructs the access network device 120-1 to sense the target sensing area. As mentioned in the description with reference to FIG. 3, in some example embodiments, the core network device 110 may update the target sensing area and reselect one or more access network devices to sense the updated target sensing area. It is further assumed that the access network device 120-1 is also one of the reselected one or more access network devices.

In the process flow 600, the core network device 110 may transmit an updated sensing instruction 602 to each of the one or more reselected access network devices. For example, the core network device 110 may transmit (605) the updated sensing instruction 602 to the access network device 120-1. The updated sensing instruction 602 can instruct the one or more reselected access network devices to sense the updated target sensing area. Therefore, the access network device 120-1 may receive (610) the updated sensing instruction 602 from the core network device 110.

Afterwards, the terminal device 130-1, the core network device 110, and the access network device 120-1 can interact with one another in an analogous manner to the process flow 300. For example, the access network device 120-1 can obtain (615) an updated sensing result 604 by sensing the updated target sensing area using the sensor of the access network device 120-1. Then, the access network device 120-1 may transmit (620) the updated sensing result 604 to the core network device 110. On the receiving side, the core network device 110 can receive (625) the updated sensing result 604 from the access network device 120-1. Actually, the core network device 110 may receive updated sensing results of the updated target sensing area from the one or more reselected access network devices.

Next, the core network device 110 can transmit (630) an updated sensing response 606 to the terminal device 130-1. The updated sensing response 606 may be determined based on the updated sensing results from the one or more reselected access network devices. Accordingly, the terminal device 130-1 may receive (635) the updated sensing response 606 from the core network device 110. The updated sensing response 606 may be associated with the updated target sensing area determined based on the previous target sensing area and the change tendency.

Through the process flow 600, the sensing of the updated target sensing area can be performed in an efficient and effective manner, thereby improving the sensing performance of the sensing of the updated target sensing area.

Figure 7:
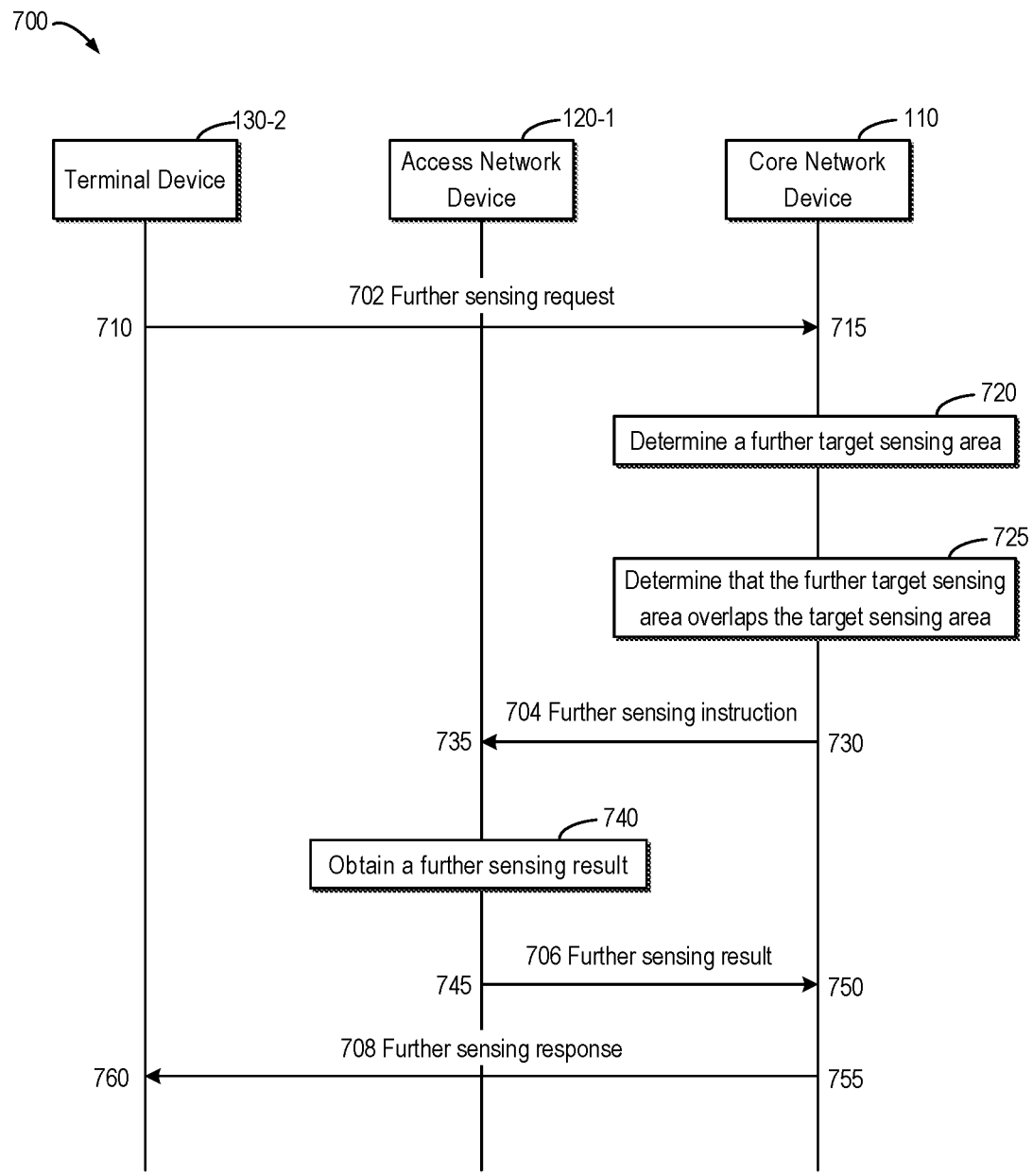
FIG. 7 illustrates an example of a process flow for sensing a further dynamic sensing area requested by a further terminal device in accordance with some example embodiments of the present disclosure.

FIG. 7 illustrates an example of a process flow 700 for sensing a further dynamic sensing area requested by a further terminal device in accordance with some example embodiments of the present disclosure. It is noted that the process flow 700 can be performed in combination with or in addition to the process flow 300. For the purpose of discussion, the process flow 700 will be described with reference to FIG. 1. It would be appreciated that although the process flow 700 has been described referring to the network environment 100 of FIG. 1, this process flow 700 may be likewise applied to other similar communication scenarios.

With reference to both FIGS. 3 and 7, it is assumed that the terminal device 130-1 already transmits the sensing request 302 to the core network device 110 to request the network side to sensing a dynamic sensing area. It is assumed that another terminal device (for example, the terminal device 130-2) also transmits another sensing request to the core network device 110 to request the network side to sensing another dynamic sensing area. In other words, in the process flow 700, the terminal device 130-2 can transmit (710) a further sensing request 702 to the core network device 110. The further sensing request 702 can indicate a further initial sensing area and a further change tendency of the further initial sensing area. Accordingly, the core network device 110 may receive (715) the further sensing request 702 from the terminal device 130-2.

Then, the core network device 110 can determine (720) a further target sensing area based on the further initial sensing area and the further change tendency. Afterwards. the core network device 110 may determine (725) that the further target sensing area overlaps the target sensing area. Then, the core network device 110 can determine that the two target sensing areas can be together sensed by the access network device 120-1 simultaneously. For example, the access network device 120-1 can sense a union area of the two target sensing areas. In a more general example, the SNF of the core network device 110 can configure the sensor (such as sensing radar) of the access network device 120-1 to serve one or more on-demand sensing requests from different terminal devices, if the on-demand sensing requests have overlap areas.

Therefore, the core network device 110 can transmit (730) a further sensing instruction 704 to the access network device 120-1. The further sensing instruction 704 can instruct the access network device 120-1 to sense the further target sensing area. On the receiving side, the access network device 120-1 may receive (735) the further sensing instruction 704 from the core network device 110.

After that, the access network device 120-1 may obtain (740) a further sensing result 706 by sensing the further target sensing area using the sensor of the access network device 120-1. Then, the access network device 120-1 can transmit (745) the further sensing result 706 to the core network device 110. Accordingly, the core network device 110 can receive (750) the further sensing result 706 from the access network device 120-1.

Next, the core network device 110 may transmit (755) a further sensing response 708 to the terminal device 130-2. The further sensing response 708 may be determined by the core network device 110 based on the further sensing result 706. On the other side, the terminal device 130-2 may receive (760) the further sensing response 708 from the core network device 110.

Through the process flow 700, different on-demand dynamic sensing areas requested by different terminal devices can be sensed by a same access network device, thereby enhancing the resource utilization of the sensing resources of the access network device and improving the sensing efficiency of the on-demand dynamic sensing.

Figure 8:
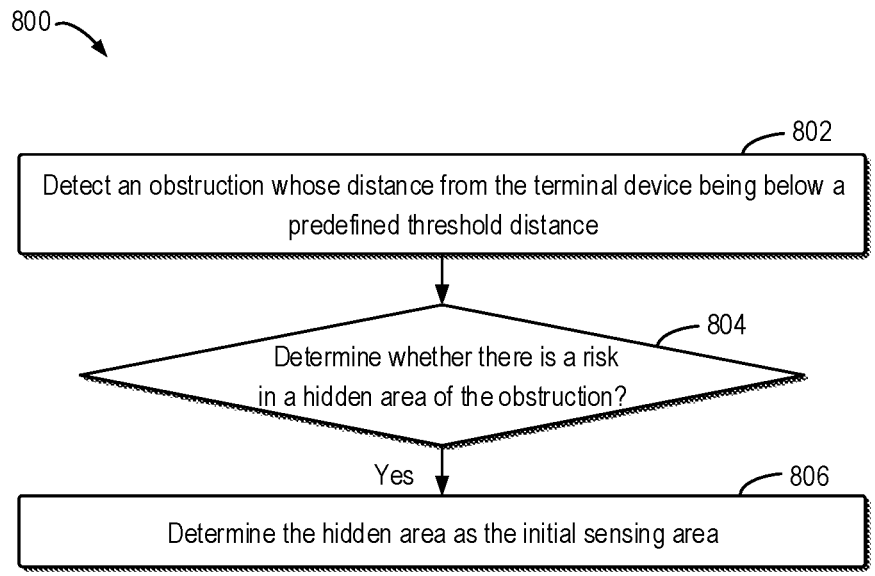
FIG. 8 illustrates a flowchart of determining an initial sensing area by a terminal device in accordance with some example embodiments of the present disclosure.

FIG. 8 illustrates a flowchart 800 of determining the initial sensing area by the terminal device 130-1 in accordance with some example embodiments of the present disclosure. It is noted that the flowchart 800 can be performed in combination with or in addition to the process flow 300. For the purpose of discussion, the flowchart 800 will be described with reference to FIG. 1. It would be appreciated that although the flowchart 800 has been described referring to the network environment 100 of FIG. 1, this flowchart 800 may be likewise applied to other similar communication scenarios.

At block 802, the terminal device 130-1 may detect an obstruction whose distance from the terminal device 130-1 is below a predefined threshold distance. At block 804, for a vehicle associated with the terminal device 130-1, the terminal device 130-1 can determine whether there is a risk in a hidden area of the obstruction. If the terminal device 130-1 determines that there is a risk in the hidden area, then at block 806 the terminal device 130-1 may determine the hidden area as the initial sensing area.

Through the flowchart 800, the terminal device 130-1 can transmit a sensing request to the core network device 110 based on a high risk associated with an obstruction, thereby saving the sensing resources of the network side for sensing the on-demand dynamic sensing area requested by the terminal device 130-1.

Figure 9:
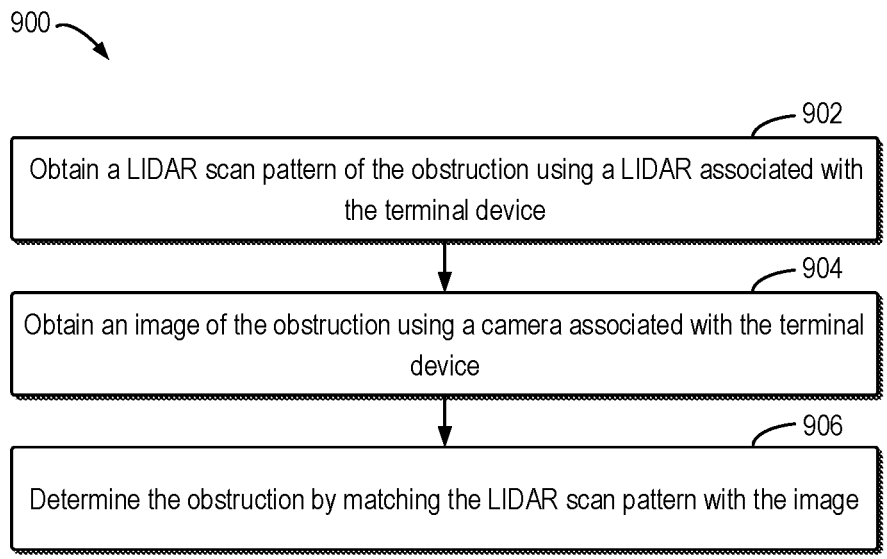
FIG. 9 illustrates a flowchart of determining an obstruction by a terminal device in accordance with some example embodiments of the present disclosure.

FIG. 9 illustrates a flowchart 900 of determining an obstruction by the terminal device 130-1 in accordance with some example embodiments of the present disclosure. It is noted that the flowchart 900 can be performed in combination with or in addition to the flowchart 800. For the purpose of discussion, the flowchart 900 will be described with reference to FIG. 1. It would be appreciated that although the flowchart 900 has been described referring to the network environment 100 of FIG. 1, this flowchart 900 may be likewise applied to other similar communication scenarios.

At block 902, the terminal device 130-1 may obtain a LIDAR scan pattern of the obstruction using a LIDAR associated with the terminal device 130-1. At block 904, the terminal device 130-1 can obtain an image of the obstruction using a camera associated with the terminal device 130-1. At block 906, the terminal device 130-1 may determine the obstruction by matching the LIDAR scan pattern with the image.

Through the flowchart 900, the terminal device 130-1 can perform the obstruction recognition in an efficient and effective way, thereby improving the efficiency and accuracy of the obstruction recognition.

Figure 10:
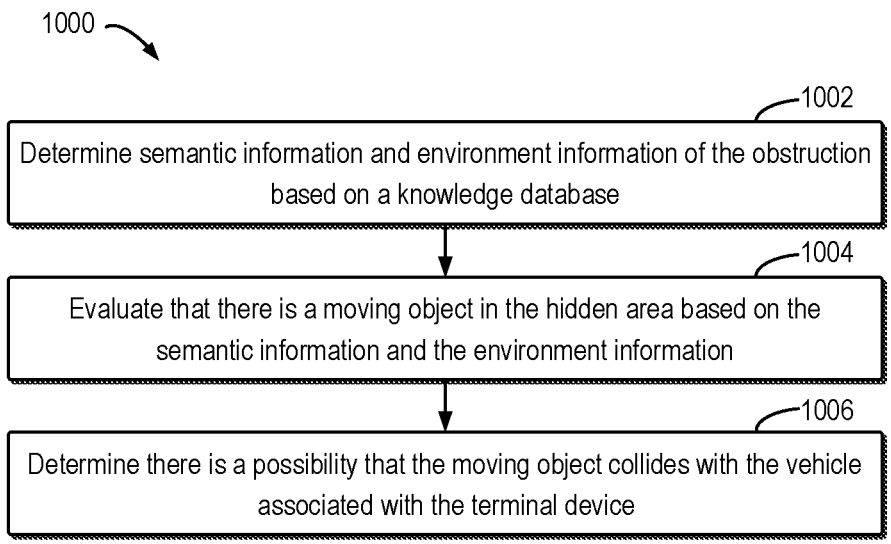
FIG. 10 illustrates a flowchart of determining a risk in a hidden area by a terminal device in accordance with some example embodiments of the present disclosure.

FIG. 10 illustrates a flowchart 1000 of determining a risk in a hidden area by the terminal device 130-1 in accordance with some example embodiments of the present disclosure. It is noted that the flowchart 1000 can be performed in combination with or in addition to the flowchart 800. For the purpose of discussion, the flowchart 1000 will be described with reference to FIG. 1. It would be appreciated that although the flowchart 1000 has been described referring to the network environment 100 of FIG. 1, this flowchart 1000 may be likewise applied to other similar communication scenarios.

At block 1002, the terminal device 130-1 may determine semantic information and environment information of the obstruction based on a knowledge database. At block 1004, the terminal device 130-1 can evaluate that there is a moving object in the hidden area based on the semantic information and the environment information. At block 1006, the terminal device 130-1 may determine there is a possibility that the moving object collides with the vehicle associated with the terminal device 130-1.

Through the flowchart 1000, the terminal device 130-1 can determine a risk associated with an obstruction in an efficient and effective way, thereby improving the efficiency and accuracy of the risk recognition and the initial sensing area determination.

Figure 11:
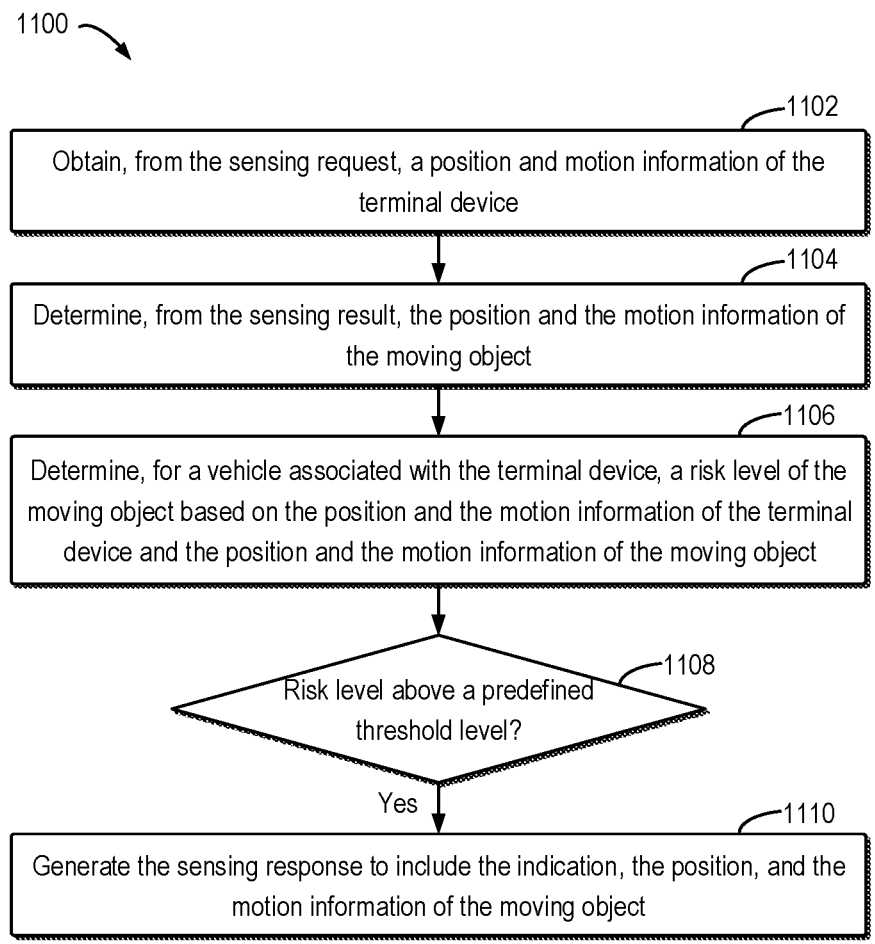
FIG. 11 illustrates a flowchart of generating a sensing response by a core network device in accordance with some example embodiments of the present disclosure.

FIG. 11 illustrates a flowchart 1100 of generating a sensing response by the core network device 110 in accordance with some example embodiments of the present disclosure. It is noted that the flowchart 1100 can be performed in combination with or in addition to the process flow 300. For the purpose of discussion, the flowchart 1100 will be described with reference to FIGS. 1 and 3. It would be appreciated that although the flowchart 1100 has been described referring to the network environment 100 of FIG. 1, this flowchart 1100 may be likewise applied to other similar communication scenarios.

At block 1102, the core network device 110 can obtain a position and motion information of the terminal device 130-1 from the sensing request 302. At block 1104, the core network device 110 may determine the position and the motion information of the moving object from the sensing result 306. At block 1106, for a vehicle associated with the terminal device 130-1, the core network device 110 may determine a risk level of the moving object based on the position and the motion information of the terminal device 130-1 and the position and the motion information of the moving object.

At block 1108, the core network device 110 can determine whether the risk level of the moving object is above a predefined threshold level. If the core network device 110 determines that the risk level of the moving object is above the predefined threshold level, then at block 1110 the core network device 110 may generate the sensing response 308 to include the indication, the position, and the motion information of the moving object. Accordingly, the sensing response 308 received by the terminal device 130-1 may indicate one or more moving objects with a risk level for the vehicle associated with the terminal device above the predefined threshold level.

Through the flowchart 1100, the core network device 110 may generate the sensing response 308 to contain relative important information (such as risky moving objects) for the terminal device 130-1, thereby enhancing the information efficiency of the sensing response and reducing signaling overhead of the sensing response 308. Further, a risk level can be determined for each moving object, thereby providing more different operation possibilities for different moving objects and enhancing the operation flexibility.

Figure 12:
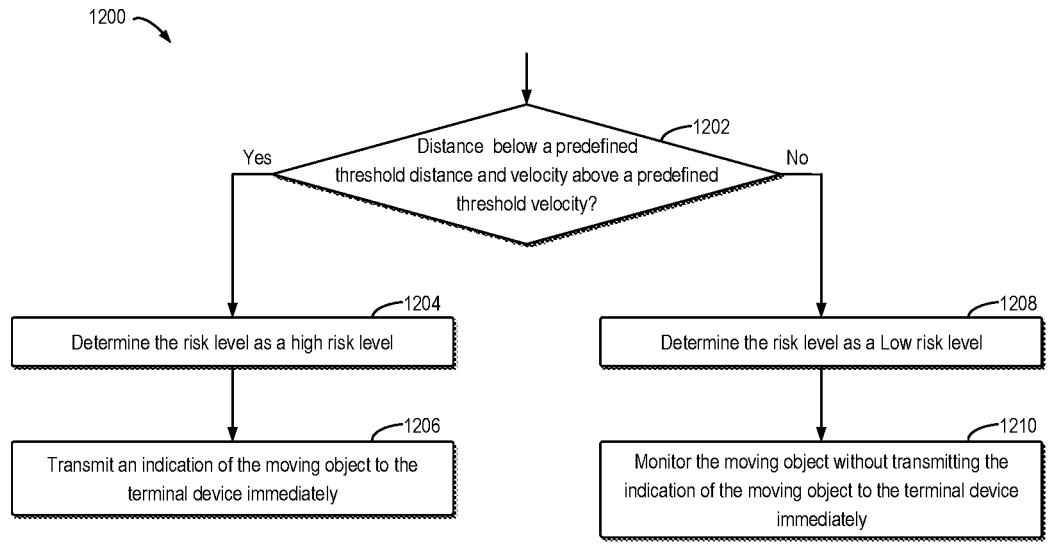
FIG. 12 illustrates a flowchart of determining whether a risk level of a moving object is high or low by a core network device in accordance with some example embodiments of the present disclosure.

FIG. 12 illustrates a flowchart 1200 of determining whether a risk level of a moving object is high or low by the core network device 110 in accordance with some example embodiments of the present disclosure. It is noted that the flowchart 1200 can be performed in combination with or in addition to the process flow 300. For the purpose of discussion, the flowchart 1200 will be described with reference to FIG. 1. It would be appreciated that although the flowchart 1200 has been described referring to the network environment 100 of FIG. 1, this flowchart 1200 may be likewise applied to other similar communication scenarios.

In some example embodiments, the core network device 110 can determine the risk level of a moving object based on the distance between the moving object and the terminal device 130-1 and a velocity of the moving object relative to the terminal device 130-1. For example, at block 1202, the core network device 110 may determine whether the distance is less than a predefined threshold distance and the velocity is greater than a predefined threshold velocity. If the core network device 110 determines that the distance between is below the predefined threshold distance and the velocity is above the predefined threshold velocity, then at block 1204, the core network device 110 may determine the risk level as a high risk level.

Further, if the core network device 110 determines the risk level as the high risk level, then at block 1206, the core network device 110 can transmit an indication of the moving object to the terminal device 130-1 immediately. Accordingly, upon receiving the indication of the moving object from the core network device 110, the terminal device 130-1 can cause the associated vehicle to be controlled to avoid a collision with the moving object. As such, the security of the vehicle and associated passengers can be improved. For example, if the vehicle is in an automatic or assisted driving state, the terminal device 130-1 may directly control the driving of the vehicle to avoid the collision. Otherwise, if the vehicle is driven by a user of the terminal device 130-1, the terminal device 130-1 may alert the user to the moving object so as to control the driving of the vehicle to avoid the collision.

On the other hand, at block 1202, if the core network device 110 determines that the distance is above the predefined threshold distance or the velocity is below the predefined threshold velocity, then at block 1208, the core network device 110 may determine the risk level as a low risk level. If the core network device 110 determines the risk level as the low risk level, then at block 1210 the core network device 110 may monitor the moving object without transmitting the indication of the moving object to the terminal device 130-1 immediately.

Through the flowchart 1200, a highly risky moving object can be informed to the terminal device 130-1 immediately, thereby improving the security of the user of the terminal device 130-1, for example, associated with a vehicle with autopilot or assisted driving function. Further, the risks of moving objects can be classified into high risks or low risks, so that different report manners can be performed for different moving objects, thereby enhancing the operation flexibility.

Figure 13:
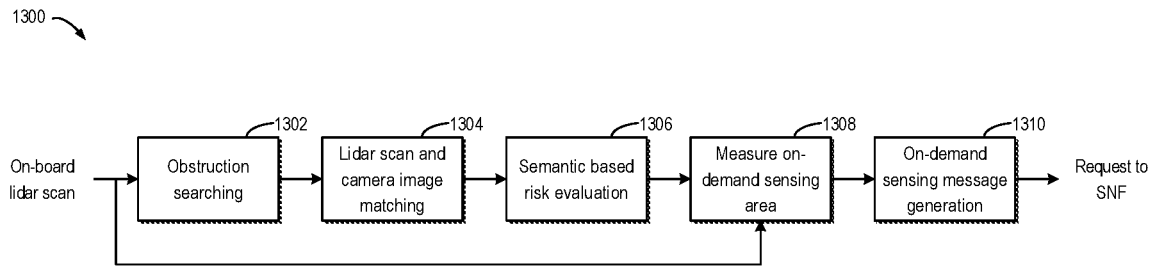
FIG. 13 illustrates an example of UE functions for supporting the on-demand dynamic sensing in accordance with some example embodiments of the present disclosure.

FIG. 13 illustrates an example 1300 of UE functions for supporting the on-demand dynamic sensing in accordance with some example embodiments of the present disclosure. It is noted that these UE functions may be implemented in any one or more of the terminal devices 130 in FIG. 1. However, it is to be understood that these UE functions are described only for the purpose of illustration without suggesting any limitation as to the scope of the disclosure. As shown in FIG. 13, the UE functions may include an obstruction searching function 1302, a LIDAR scan and camera image matching function 1304, a semantic based risk evaluation function 1306, a measure on-demand sensing area function 1308, and an on-demand sensing message generation function 1310.

Some example embodiments of the present disclosure introduce a new operation procedure between a UE and an SNF (Sensing Network Function) of the core network, which may be a new core JCAS function to control and manage based station (BS) sensing radar. In an example embodiment, the UE may send an on-demand sensing request message to the SNF for on-demand dynamic sensing. The request message may provide necessary information to describe the dynamic sensing area as well as its change tendency. Then, the SNF can control BS sensing radar to track and sense a dynamic area requested by the UE.

When the UE (such as associated with a vehicle) moves from a position to another position, the dynamic sensing area can be updated. The dynamic feature may be defined by some motion parameters, including the velocity, the acceleration and the yaw of the UE, and a moving obstruction's velocity, acceleration and yaw relative to the UE. The UE can measure these parameters via an on-board LIDAR or other sensors. When the UE motion state changes or the edge points of the obstruction contour changes, the UE may request a new on-demand dynamic sensing area to replace the previous dynamic area.

Therefore, some example embodiments of the present disclosure introduce a new function entity in the UE, for example, the UE can be a vehicle with autopilot or assisted driving function. The function entity can analyze LIDAR scanning results and generate an on-demand dynamic sensing area. The function entity can monitor the effectiveness of a previous on-demand sensing area according to the current vehicle position related to the obstructions. The function entity can also make use of a camera to extract semantic information of the obstruction and evaluate a risk level of blind spots. Based on above measurements and analysis, the function entity can send on-demand sensing request messages and release messages to the SNF.

More specifically, the UE can analyze on-board LIDAR scan patterns to find obstructions. Behind these obstructions, some risky moving objects may be hidden, which may lead to a collision with the current vehicle. Any static or moving obstruction, whose distance to the vehicle is less than a predefined threshold may be monitored. But not all obstructions may hide risky objects. Thus, the UE can extract obstruction image and match it with the obstruction's LIDAR scan pattern. The image can be collected via an on-board camera. The matching can be based on the position and the obstruction size in both the LIDAR scan pattern and the camera image. After that, the UE may extract semantic information of the obstruction and its environment information, for example, trees, houses, schools, entrances, intersections, or the like. During this period, the UE can make use of some knowledge database information.

According to the semantic information, the UE can evaluate whether the hidden area of the obstruction has moving objects, for example, a moving car, a moving cyclist, an animal, or a human, and whether those moving objects may intrude in front of the current UE, for example, animals in a corral cannot intrude on the road and cannot lead to a risk. Only the obstruction hiding a high risk area may be considered to request BS sensing. For example, the hidden area of an obstruction has an entrance or a way connecting the path of the moving UE, or the hidden area of an obstruction always has animals or humans who may intrude in front of the moving UE.

For those risky areas, the UE can measure sensing area's parameters for BS on-demand sensing. The UE may calculate the obstruction contour over LIDAR scan pattern and obtain edge point positions (for example, two edge point positions) related to the current vehicle. These two edge points of obstruction contour and the vehicle current position can form two half-lines as shown in FIGS. 2A and 2B. In the area sandwiched between these two half-lines, the inside area of the obstruction contour is visible by the on-board LIDAR. But the outside area of the obstruction contour is invisible by the on-board LIDAR. The UE may request BS sensing radar to sense that blind spot behind the obstruction. In some cases, the obstruction is a moving object, for example, a car round the current vehicle as shown in FIG. 2C. In such cases, besides the position information of the two edge points, the UE can measure their moving states via the on-board LIDAR to obtain their velocities, accelerations and yaws relative to the current vehicle. Besides the obstruction feature parameters, the UE can provide the expected maximum BS sensing scope referring to its current velocity and its distance to the obstruction. Based on the obstruction contour, the UE can also provide the expected minimum BS sensing scope.

Finally, the UE can determine a clear on-demand sensing area, which may be a sector area surrounded by above two half-lines, inner radius (minimum scope) and outer radius (maximum scope). The UE can also determine the change tendency of the sensing area via motion parameters, for example, the current vehicle position (in an earth coordination system), the edge positions of the obstruction contour (in a vehicle coordination system), the maximum radius, the minimum radius, the current vehicle velocity, acceleration and yaw (in an earth coordination system), the moving obstruction velocity, acceleration and yaw (in a vehicle coordination system). After measuring and calculating the on-demand sensing area features, the UE may generate an on-demand dynamic sensing request message. This request message may include sensing area characteristic parameters and indication information, for example, an obstruction semantic description (for example, what it is), an on-demand sensing area index, a UE identification, and so on.

Figure 14:
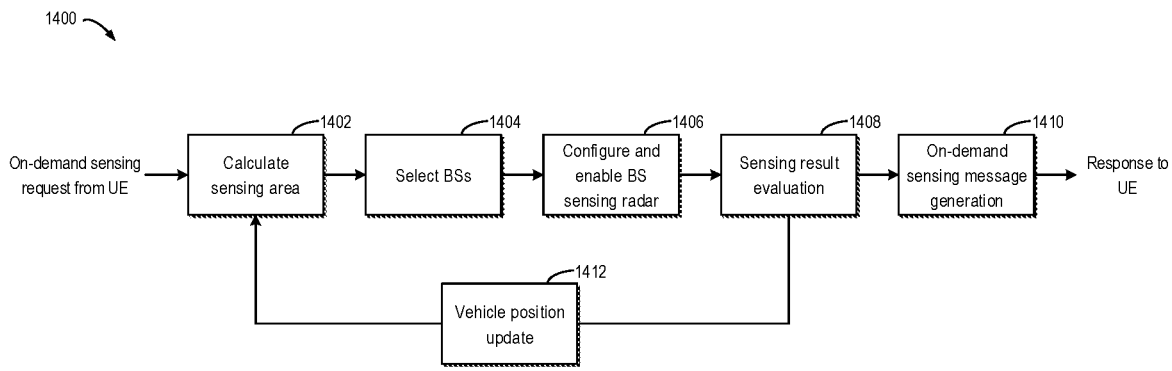
FIG. 14 illustrates an example of SFN functions for supporting the on-demand dynamic sensing in accordance with some example embodiments of the present disclosure.

FIG. 14 illustrates an example 1400 of SFN functions for supporting the on-demand dynamic sensing in accordance with some example embodiments of the present disclosure. It is noted that these SFN functions may be implemented in the core network device 110 in FIG. 1. However, it is to be understood that these SFN functions are described only for the purpose of illustration without suggesting any limitation as to the scope of the disclosure. As shown in FIG. 14, the SFN functions may include a calculate sensing area function 1402, a select BS function 1404, a configure and enable BS sensing radar function 1406, a sensing result evaluation function 1408, an on-demand sensing message generation function 1410, and a vehicle position update function 1412.

Some example embodiments of the present disclosure introduce a new function entity in the SNF. The function entity can select and configure BS sensing radar according to a UE on-demand dynamic sensing request. For example, for each on-demand dynamic sensing request, the function entity may select one or more base stations. One or more base stations can be selected for sensing one on-demand sensing area. The function entity may calculate and track the dynamic sensing area according to motion parameters. The function entity can respond to the UE on-demand sensing request message, so as to report sensing results to the UE.

In an example embodiment, the UE (for example, associated with a vehicle with autopilot or assisted driving function) can have a new capability to request BS sensing radar to sense some sensing areas and also inform them as to how to adjust those sensing areas along with the movement of the UE. The on-demand sensing request message may be sent to the SNF, which may select and configure one or more BSs to sense that blind spot for the UE. Once the sensing radar starts to sense the on-demand area, the SNF may collect sensing results and send risk moving objects to UE as a response for the UE request. Based on a UE request message, the BS sensing radar can perform on-demand sensing. The BS sensing radar can be triggered by the UE and senses a special area at a special time. In this way, higher sensing efficiency can be obtained and BS resources, such as time resources, frequency resources, space resources, power resources or the like can be saved.

In some example embodiments, the SNF may be responsible for configuring and controlling the BS sensing radar according to the UE on-demand dynamic sensing request. Once the SNF receives a new UE on-demand sensing request, the SNF may calculate the sensing area and set up a sensing period. In each sensing period, the SNF may update the sensing area based on motion parameters of the on-demand dynamic sensing area. For each on-demand sensing period, the SNF may select sensing BSs and allocate resources, such as time resources, frequency resources, spatial resources, power resources for the selected BSs. The BS sensing radar may sense the corresponding dynamic area and extract moving objects from the sensing data and send sensing results to the SNF.

The SNF may collect sensing results from the BSs, analyze all sensed moving objects and evaluate a risk level referring to positions and motion states of the moving objects related to the current vehicle. For example, any moving object which is close to the vehicle and has high speed toward to the vehicle may be indicated with a high risk and be informed to the UE immediately. One the other hand, any moving object which is far from the vehicle may be indicated with a low risk or no risk. This moving object may be monitored and does not need to be reported to the UE immediately.

For each on-demand sensing request, the SNF may provide a series of responses to the UE. The response message can be sent to the UE in the sensing period until receiving a new request message or a release message corresponding to the current on-demand sensing area. For those high risk objects, the SNF may insert an extra response to inform the UE. After each sensing period, the position of the UE may be updated and the SNF may recalculate the sensing area in the next sensing period.

Figure 15:
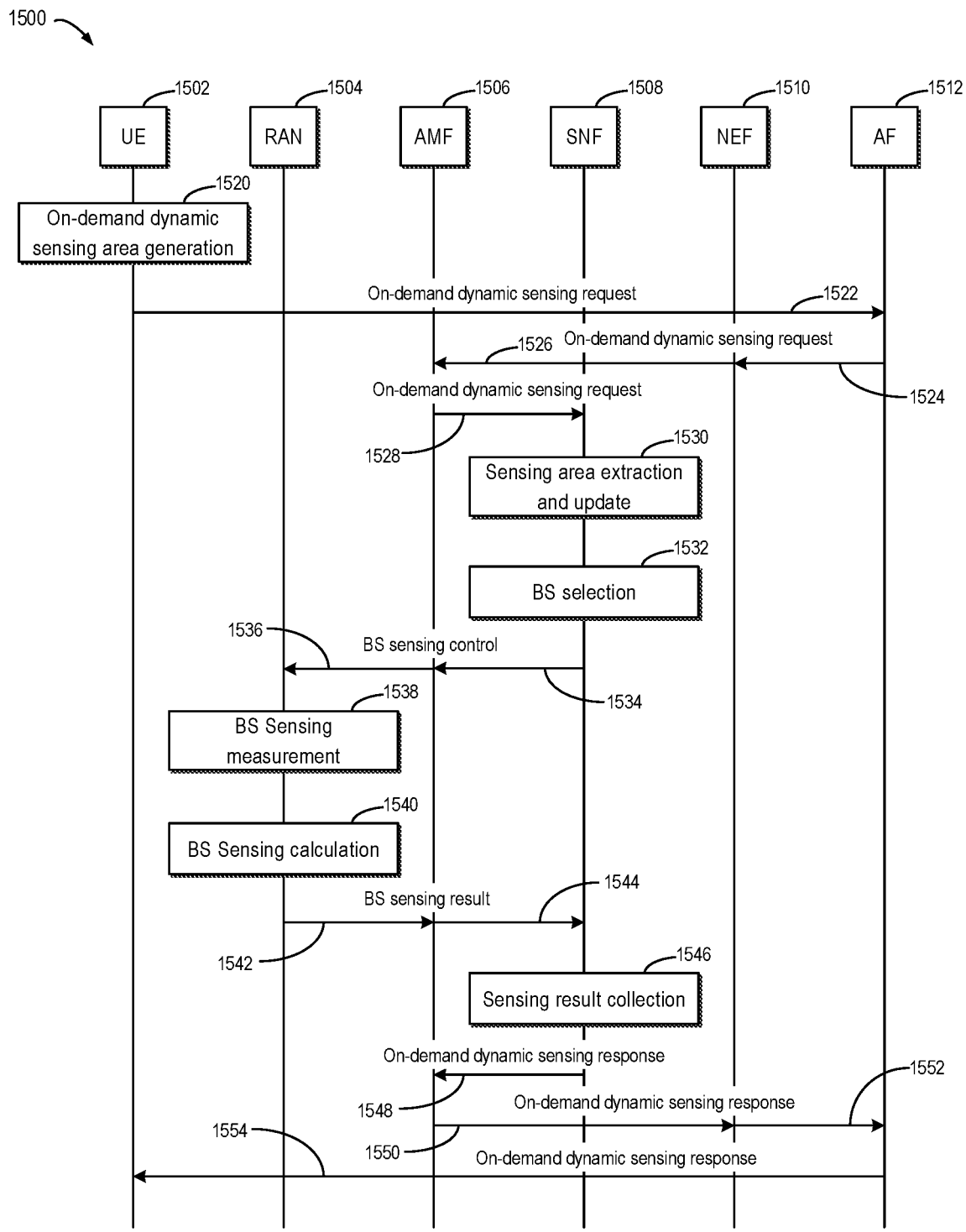
FIG. 15 illustrates an example of an on-demand dynamic sensing operation procedure in accordance with some example embodiments of the present disclosure.

FIG. 15 illustrates an example of an on-demand dynamic sensing operation procedure 1500 in accordance with some example embodiments of the present disclosure. It is noted that the operation procedure 1500 can be deemed as a further example of the process flow 300. In FIG. 15, UE 1502 refers to User Equipment, RAN 1504 refers to Radio Access Network, AMF 1506 refers to Access and Mobility Management Function, SNF 1508 refers to Sensing Network Function, NEF 1510 refers to Network Exposure Function, and AF 1512 refers to Application Function.

It is noted that any one or more of the AMF 1506, the SNF 1508, the NEF 1510, and the AF 1512 may be implemented in one or more core network devices, for example, the core network device 110 in FIG. 1. In the example operation procedure 1500, the core functions AMF 1506, NEF 1510, and AF 1512 can be used to transfer request and response messages between the UE 1502 and the SNF 1508. However, it is to be understood that these core network functions are described only for the purpose of illustration without suggesting any limitation as to the scope of the disclosure.

At 1520, the UE 1502 may generate an on-demand dynamic sensing area. At 1522, the UE 1502 may send an on-demand dynamic sensing request to the AF 1512. At 1524, the AF 1512 can send the on-demand dynamic sensing request to the NEF 1510. At 1526, the NEF 1510 may send the on-demand dynamic sensing request to the AMF 1506. At 1528, the AMF 1506 can send the on-demand dynamic sensing request to the SNF 1508. At 1530, the SNF 1508 may extract the dynamic sensing area and update the dynamic sensing area. At 1532, the SNF 1508 can select base stations (BS) to sense the dynamic sensing area. At 1534, the SNF 1508 may send a BS sensing control to the AMF 1506. At 1536, the AMF 1506 can send the BS sensing control to the RAN 1504.

At 1538, the RAN 1504 can perform BS sensing measurement. At 1540, the RAN 1504 may perform BS sensing calculation. At 1542, the RAN 1504 can send a BS sensing result to the AMF 1506. At 1544, the AMF 1506 may send the BS sensing result to the SNF 1508. At 1546, the SNF 1508 can collect the sensing results. At 1548, the SNF 1508 may send an on-demand dynamic sensing response to the AMF 1506. At 1550, the AMF 1506 can send the on-demand dynamic sensing response to the NEF 1510. At 1552, the NEF 1510 may send the on-demand dynamic sensing response to the AF 1512. At 1554, the AF 1512 can send the on-demand dynamic sensing response to the UE 1502.

Figure 16:
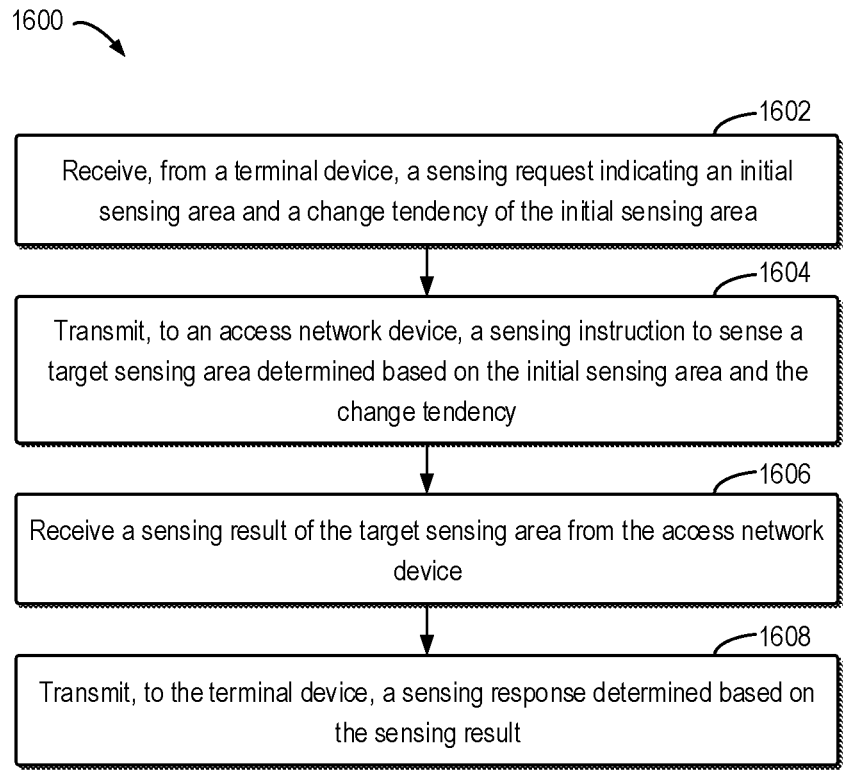
FIG. 16 illustrates a flowchart of a method implemented at a core network device in accordance with some example embodiments of the present disclosure.

FIG. 16 illustrates a flowchart 1600 of a method implemented at a core network device in accordance with some example embodiments of the present disclosure. For the purpose of discussion, the method 1600 will be described from the perspective of the core network device 110 with reference to FIG. 1.

At block 1602, the core network device 110 receives, from the terminal device 130-1, a sensing request indicating an initial sensing area and a change tendency of the initial sensing area. At block 1604, the core network device 110 transmits, to the access network device 120-1, a sensing instruction to sense a target sensing area determined based on the initial sensing area and the change tendency. At block 1606, the core network device 110 receives a sensing result of the target sensing area from the access network device 120-1. At block 1608, the core network device 110 transmits, to the terminal device 130-1, a sensing response determined based on the sensing result.

In some example embodiments, the sensing request comprises at least one of the following for indicating the initial sensing area: a current position of the terminal device 130-1, edge points of a contour of an obstruction associated with the initial sensing area, a lower sensing radius of the initial sensing area, an upper sensing radius of the initial sensing area.

In some example embodiments, the sensing request comprises at least one of the following for indicating the change tendency: a current position of the terminal device 130-1, motion information of the terminal device 130-1, and motion information of a moving obstruction associated with the initial sensing area relative to the terminal device 130-1.

In some example embodiments, the sensing request further comprises at least one of the following: semantic information of an obstruction associated with the initial sensing area, an identifier of the initial sensing area, and an identifier of the terminal device 130-1.

In some example embodiments, in response to receiving a sensing release indication from the terminal device 130-1, the core network device 110 transmits a sensing release instruction to release the sensing of the target sensing area to the access network device 120-1.

In some example embodiments, the sensing result comprises at least one of the following: an indication of a moving object in the target sensing area, a position of the moving object, motion information of the moving object, and an identifier of the target sensing area.

In some example embodiments, the core network device 110 generates the sensing response to include the sensing result.

In some example embodiments, the core network device 110 obtains, from the sensing request, a position and motion information of the terminal device 130-1; determines, from the sensing result, the position and the motion information of the moving object; and determines, for a vehicle associated with the terminal device 130-1, a risk level of the moving object based on the position and the motion information of the terminal device 130-1 and the position and the motion information of the moving object.

In some example embodiments, in response to determining that the risk level of the moving object is above a predefined threshold level, the core network device 110 generates the sensing response to include the indication, the position, and the motion information of the moving object.

In some example embodiments, the core network device 110 determines the risk level by: in response to determining that a distance between the moving object and the terminal device 130-1 is below a predefined threshold distance and a velocity of the moving object relative to the terminal device 130-1 is above a predefined threshold velocity, determining the risk level as a high risk level; and in response to determining that the distance is above the predefined threshold distance or the velocity is below the predefined threshold velocity, determining the risk level as a low risk level.

In some example embodiments, in response to determining the risk level as the high risk level, the core network device 110 transmits an indication of the moving object to the terminal device 130-1 immediately; and in response to determining the risk level as the low risk level, the core network device 110 monitors the moving object without transmitting the indication of the moving object to the terminal device 130-1 immediately.

In some example embodiments, the core network device 110 selects, from a plurality of candidate access network devices, one or more access network devices for sensing the target sensing area, the access network device 120-1 being one of the one or more selected access network devices.

In some example embodiments, the sensing instruction comprises at least one of the following: resource allocation information for allocating sensing resources to the access network device 120-1 for sensing the target sensing area, and sensor configuration information for configuring a sensor of the access network device 120-1 to sense the target sensing area.

In some example embodiments, the core network device 110 determines a sensing period for updating the target sensing area periodically.

In some example embodiments, the core network device 110 transmits the sensing response by: transmitting a plurality of sensing responses periodically based on the sensing period, the sensing response being one of the plurality of sensing responses.

In some example embodiments, in response to an end point of the sensing period, the core network device 110 updates the target sensing area based on the target sensing area and the change tendency of the initial sensing area.

In some example embodiments, the core network device 110 reselects, from a plurality of candidate access network devices, one or more access network devices for sensing the updated target sensing area.

In some example embodiments, the core network device 110 transmits, to each of the one or more reselected access network devices, an updated sensing instruction to sense the updated target sensing area; receives updated sensing results of the updated target sensing area from the one or more reselected access network devices; and transmits, to the terminal device 130-1, an updated sensing response determined based on the updated sensing results.

In some example embodiments, the core network device 110 receives, from the terminal device 130-1, a new sensing request indicating a new initial sensing area and a new change tendency of the new initial sensing area; and transmits, to the access network device 120-1, a new sensing instruction to sense a new target sensing area determined based on the new initial sensing area and the new change tendency of the new initial sensing area.

In some example embodiments, the core network device 110 receives, from a further terminal device 130-2, a further sensing request indicating a further initial sensing area and a further change tendency of the further initial sensing area; determines a further target sensing area based on the further initial sensing area and the further change tendency; determines that the further target sensing area overlaps the target sensing area; and transmits, to the access network device 120-1, a further sensing instruction to sense the further target sensing area.

Figure 17:
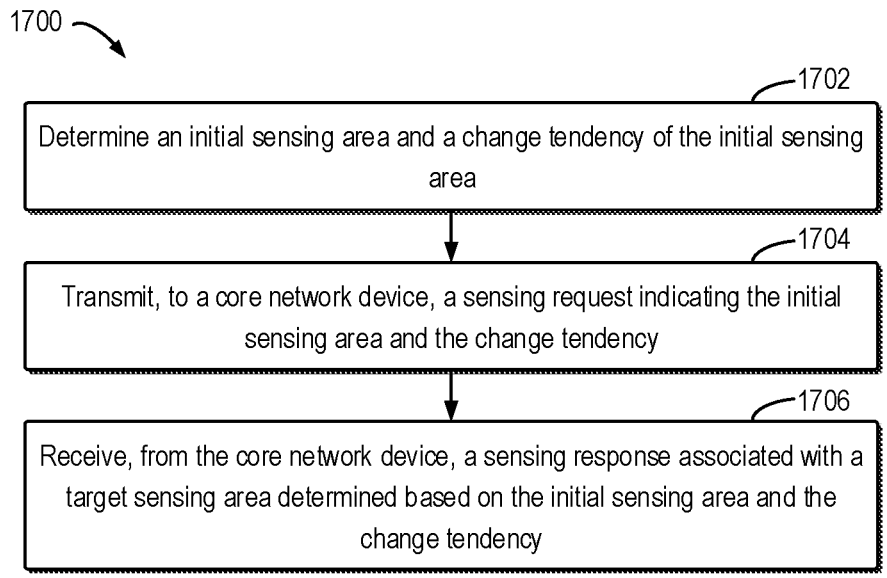
FIG. 17 illustrates a flowchart of a method implemented at a terminal device in accordance with some other embodiments of the present disclosure.

FIG. 17 illustrates a flowchart 1700 of a method implemented at a terminal device in accordance with some other embodiments of the present disclosure. For the purpose of discussion, the method 1700 will be described from the perspective of the terminal device 130-1 with reference to FIG. 1.

At block 1702, the terminal device 130-1 determines an initial sensing area and a change tendency of the initial sensing area. At block 1704, the terminal device 130-1 transmits, to the core network device 110, a sensing request indicating the initial sensing area and the change tendency. At block 1706, the terminal device 130-1 receives, from the core network device 110, a sensing response associated with a target sensing area determined based on the initial sensing area and the change tendency.

In some example embodiments, the initial sensing area comprises at least one of the following: a blind spot of a user of the terminal device 130-1, an area out of sight of the user, an area unable to be sensed by a sensor associated with the terminal device 130-1, an area behind an obstruction, a roadside area lower than a road surface, and a blind spot inherent in a vehicle associated with the terminal device 130-1.

In some example embodiments, the terminal device 130-1 determines the initial sensing area by determining at least one of the following: a current position of the terminal device 130-1, edge points of a contour of the obstruction, a lower sensing radius of the initial sensing area, and an upper sensing radius of the initial sensing area.

In some example embodiments, the terminal device 130-1 determines the change tendency by determining at least one of the following: a current position of the terminal device 130-1; motion information of the terminal device 130-1; and motion information of a moving obstruction associated with the initial sensing area relative to the terminal device 130-1.

In some example embodiments, the sensing request further comprises at least one of the following: semantic information of an obstruction associated with the initial sensing area, an identifier of the initial sensing area, and an identifier of the terminal device 130-1.

In some example embodiments, in response to determining that an area needs to be sensed is no longer determinable based on the initial sensing area and the change tendency, the terminal device 130-1 transmits, to the core network device 110, a new sensing request indicating a new initial sensing area and a new change tendency of the new initial sensing area.

In some example embodiments, in response to determining that an area determined based on the initial sensing area and the change tendency no longer needs to be sensed, the terminal device 130-1 transmits a sensing release indication to the core network device 110.

In some example embodiments, the sensing response indicates one or more moving objects with a risk level for a vehicle associated with the terminal device 130-1 above a predefined threshold level.

In some example embodiments, the terminal device 130-1 determines the initial sensing area by: detecting an obstruction whose distance from the terminal device 130-1 is below a predefined threshold distance; determining, for a vehicle associated with the terminal device 130-1, whether there is a risk in a hidden area of the obstruction; and in response to determining that there is a risk in the hidden area, determining the hidden area as the initial sensing area.

In some example embodiments, the terminal device 130-1 detects the obstruction by: obtaining a LIDAR scan pattern of the obstruction using a LIDAR associated with the terminal device 130-1; obtaining an image of the obstruction using a camera associated with the terminal device 130-1; and determining the obstruction by matching the LIDAR scan pattern with the image.

In some example embodiments, the terminal device 130-1 determines whether there is a risk by: determining semantic information and environment information of the obstruction based on a knowledge database; evaluating that there is a moving object in the hidden area based on the semantic information and the environment information; and determining there is a possibility that the moving object collides with the vehicle associated with the terminal device 130-1.

In some example embodiments, the terminal device 130-1 receives the sensing response by: receiving a plurality of sensing responses periodically, the sensing response being one of the plurality of sensing responses.

In some example embodiments, the terminal device 130-1 receives, from the core network device 110, an indication of a moving object with a high risk level for a vehicle associated with the terminal device 130-1; and causes the vehicle to be controlled to avoid a collision with the moving object.

In some example embodiments, the terminal device 130-1 receives, from the core network device 110, an updated sensing response associated with an updated target sensing area determined based on the target sensing area and the change tendency.

Figure 18:
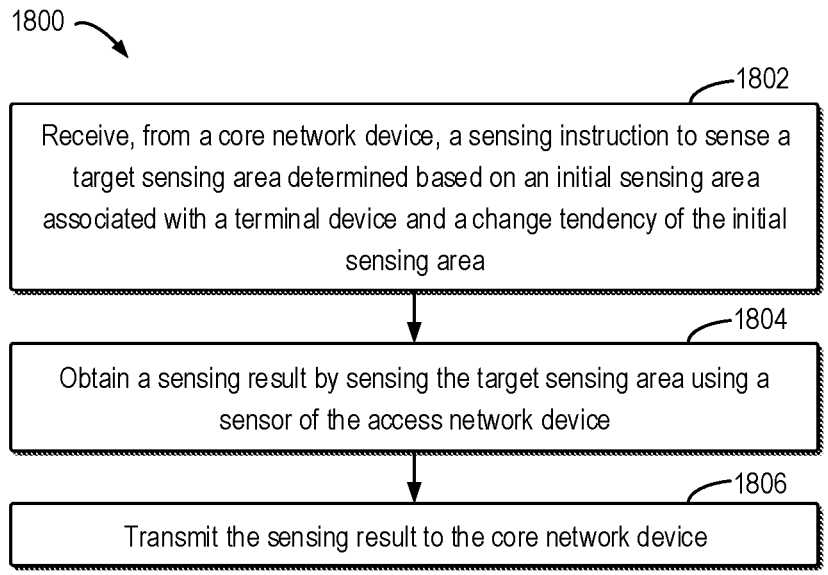
FIG. 18 illustrates a flowchart of a method implemented at an access network device in accordance with some other embodiments of the present disclosure.

FIG. 18 illustrates a flowchart 1800 of a method implemented at an access network device in accordance with some other embodiments of the present disclosure. For the purpose of discussion, the method 1800 will be described from the perspective of the access network device 120-1 with reference to FIG. 1.

At block 1802, the access network device 120-1 receives, from the core network device 110, a sensing instruction to sense a target sensing area determined based on an initial sensing area associated with the terminal device 130-1 and a change tendency of the initial sensing area. At block 1804, the access network device 120-1 obtains a sensing result by sensing the target sensing area using a sensor of the access network device 120-1. At block 1806, the access network device 120-1 transmits the sensing result to the core network device 110.

In some example embodiments, the access network device 120-1 senses the target sensing area by: obtaining, from the sensing instruction, at least one of first motion information of the terminal device 130-1 and second motion information of a moving obstruction relative to the terminal device 130-1; and tracking the target sensing area based on the at least one of the first motion information and the second motion information.

In some example embodiments, in response to receiving, from the core network device 110, a sensing release instruction to release the sensing of the target sensing area, the access network device 120-1 switches the sensor of the access network device 120-1 into a power saving state.

In some example embodiments, the access network device 120-1 obtains the sensing result by: determining an identifier of a moving object detected in the target sensing area; determining a position of the moving object, determining motion information of the moving object relative to the terminal device 130-1, and determining an identifier of the target sensing area.

In some example embodiments, the access network device 120-1 obtains, from the sensing instruction, resource allocation information for allocating sensing resources to the access network device 120-1 for sensing the target sensing area; and senses the target sensing area using the allocated sensing resources.

In some example embodiments, the access network device 120-1 obtains, from the sensing instruction, sensor configuration information for configuring the sensor of the access network device 120-1 to sense the target sensing area; and configures the sensor of the access network device 120-1 based on the sensor configuration information.

In some example embodiments, the access network device 120-1 receives, from the core network device 110, a further sensing instruction to sense a further target sensing area overlapping the target sensing area; obtains a further sensing result by sensing the further target sensing area using the sensor of the access network device 120-1; and transmits the further sensing result to the core network device 110.

In some example embodiments, the access network device 120-1 receives, from the core network device 110, an updated sensing instruction to sense an updated target sensing area; obtains an updated sensing result by sensing the updated target sensing area using the sensor of the access network device 120-1; and transmits the updated sensing result to the core network device 110.

In some example embodiments, an apparatus capable of performing the method 1600 (for example, the core network device 110) may comprise means for performing the respective steps of the method 1600. The means may be implemented in any suitable form. For example, the means may be implemented in a circuitry or software module.

In some example embodiments, the apparatus comprises: means for receiving, at a core network device and from a terminal device, a sensing request indicating an initial sensing area and a change tendency of the initial sensing area; means for transmitting, to an access network device, a sensing instruction to sense a target sensing area determined based on the initial sensing area and the change tendency; means for receiving a sensing result of the target sensing area from the access network device; and means for transmitting, to the terminal device, a sensing response determined based on the sensing result.

In some example embodiments, the sensing request comprises at least one of the following for indicating the initial sensing area: a current position of the terminal device, edge points of a contour of an obstruction associated with the initial sensing area, a lower sensing radius of the initial sensing area, an upper sensing radius of the initial sensing area.

In some example embodiments, the sensing request comprises at least one of the following for indicating the change tendency: a current position of the terminal device, motion information of the terminal device, and motion information of a moving obstruction associated with the initial sensing area relative to the terminal device.

In some example embodiments, the sensing request further comprises at least one of the following: semantic information of an obstruction associated with the initial sensing area, an identifier of the initial sensing area, and an identifier of the terminal device.

In some example embodiments, the apparatus further comprises means for in response to receiving a sensing release indication from the terminal device, transmitting a sensing release instruction to release the sensing of the target sensing area to the access network device.

In some example embodiments, the sensing result comprises at least one of the following: an indication of a moving object in the target sensing area, a position of the moving object, motion information of the moving object, and an identifier of the target sensing area.

In some example embodiments, the apparatus further comprises means for generating the sensing response to include the sensing result.

In some example embodiments, the apparatus further comprises: means for obtaining, from the sensing request, a position and motion information of the terminal device; means for determining, from the sensing result, the position and the motion information of the moving object; and means for determining, for a vehicle associated with the terminal device, a risk level of the moving object based on the position and the motion information of the terminal device and the position and the motion information of the moving object.

In some example embodiments, the apparatus further comprises means for in response to determining that the risk level of the moving object is above a predefined threshold level, generating the sensing response to include the indication, the position, and the motion information of the moving object.

In some example embodiments, the means for determining the risk level comprises: means for in response to determining that a distance between the moving object and the terminal device is below a predefined threshold distance and a velocity of the moving object relative to the terminal device is above a predefined threshold velocity, determining the risk level as a high risk level; and means for in response to determining that the distance is above the predefined threshold distance or the velocity is below the predefined threshold velocity, determining the risk level as a low risk level.

In some example embodiments, the apparatus further comprises: means for in response to determining the risk level as the high risk level, transmitting an indication of the moving object to the terminal device immediately; and means for in response to determining the risk level as the low risk level, monitoring the moving object without transmitting the indication of the moving object to the terminal device immediately.

In some example embodiments, the apparatus further comprises means for selecting, from a plurality of candidate access network devices, one or more access network devices for sensing the target sensing area, the access network device being one of the one or more selected access network devices.

In some example embodiments, the sensing instruction comprises at least one of the following: resource allocation information for allocating sensing resources to the access network device for sensing the target sensing area, and sensor configuration information for configuring a sensor of the access network device to sense the target sensing area.

In some example embodiments, the apparatus further comprises means for determining a sensing period for updating the target sensing area periodically.

In some example embodiments, the means for transmitting the sensing response comprises: means for transmitting a plurality of sensing responses periodically based on the sensing period, the sensing response being one of the plurality of sensing responses.

In some example embodiments, the apparatus further comprises: means for in response to an end point of the sensing period, updating the target sensing area based on the target sensing area and the change tendency of the initial sensing area.

In some example embodiments, the apparatus further comprises: means for reselecting, from a plurality of candidate access network devices, one or more access network devices for sensing the updated target sensing area.

In some example embodiments, the apparatus further comprises: means for transmitting, to each of the one or more reselected access network devices, an updated sensing instruction to sense the updated target sensing area; means for receiving updated sensing results of the updated target sensing area from the one or more reselected access network devices; and means for transmitting, to the terminal device, an updated sensing response determined based on the updated sensing results.

In some example embodiments, the apparatus further comprises: means for receiving, from the terminal device, a new sensing request indicating a new initial sensing area and a new change tendency of the new initial sensing area; and means for transmitting, to the access network device, a new sensing instruction to sense a new target sensing area determined based on the new initial sensing area and the new change tendency of the new initial sensing area.

In some example embodiments, the apparatus further comprises: means for receiving, from a further terminal device, a further sensing request indicating a further initial sensing area and a further change tendency of the further initial sensing area; means for determining a further target sensing area based on the further initial sensing area and the further change tendency; means for determining that the further target sensing area overlaps the target sensing area; and means for transmitting, to the access network device, a further sensing instruction to sense the further target sensing area.

In some example embodiments, the apparatus further comprises means for performing other steps in some example embodiments of the method 1600. In some example embodiments, the means comprises at least one processor; and at least one memory including computer program code, the at least one memory and computer program code configured to, with the at least one processor, cause the performance of the apparatus.

In some example embodiments, an apparatus capable of performing the method 1700 (for example, the terminal device 130-1) may comprise means for performing the respective steps of the method 1700. The means may be implemented in any suitable form. For example, the means may be implemented in a circuitry or software module.

In some example embodiments, the apparatus comprises: means for determining, at a terminal device, an initial sensing area and a change tendency of the initial sensing area; means for transmitting, to a core network device, a sensing request indicating the initial sensing area and the change tendency; and means for receiving, from the core network device, a sensing response associated with a target sensing area determined based on the initial sensing area and the change tendency.

In some example embodiments, the initial sensing area comprises at least one of the following: a blind spot of a user of the terminal device, an area out of sight of the user, an area unable to be sensed by a sensor associated with the terminal device, an area behind an obstruction, a roadside area lower than a road surface, and a blind spot inherent in a vehicle associated with the terminal device.

In some example embodiments, the means for determining the initial sensing area comprises means for determining at least one of the following: a current position of the terminal device, edge points of a contour of the obstruction, a lower sensing radius of the initial sensing area, and an upper sensing radius of the initial sensing area.

In some example embodiments, the means for determining the change tendency comprises means for determining at least one of the following: a current position of the terminal device; motion information of the terminal device; and motion information of a moving obstruction associated with the initial sensing area relative to the terminal device.

In some example embodiments, the sensing request further comprises at least one of the following: semantic information of an obstruction associated with the initial sensing area, an identifier of the initial sensing area, and an identifier of the terminal device.

In some example embodiments, the apparatus further comprises: means for in response to determining that an area needs to be sensed is no longer determinable based on the initial sensing area and the change tendency, transmitting, to the core network device, a new sensing request indicating a new initial sensing area and a new change tendency of the new initial sensing area.

In some example embodiments, the apparatus further comprises: means for in response to determining that an area determined based on the initial sensing area and the change tendency no longer needs to be sensed, transmitting a sensing release indication to the core network device.

In some example embodiments, the sensing response indicates one or more moving objects with a risk level for a vehicle associated with the terminal device above a predefined threshold level.

In some example embodiments, the means for determining the initial sensing area comprises: means for detecting an obstruction whose distance from the terminal device is below a predefined threshold distance; means for determining, for a vehicle associated with the terminal device, whether there is a risk in a hidden area of the obstruction; and means for in response to determining that there is a risk in the hidden area, determining the hidden area as the initial sensing area.

In some example embodiments, the means for detecting the obstruction comprises: means for obtaining a LIDAR scan pattern of the obstruction using a LIDAR associated with the terminal device; means for obtaining an image of the obstruction using a camera associated with the terminal device; and means for determining the obstruction by matching the LIDAR scan pattern with the image.

In some example embodiments, the means for determining whether there is a risk comprises: means for determining semantic information and environment information of the obstruction based on a knowledge database; means for evaluating that there is a moving object in the hidden area based on the semantic information and the environment information; and means for determining there is a possibility that the moving object collides with the vehicle associated with the terminal device.

In some example embodiments, the means for receiving the sensing response comprises: means for receiving a plurality of sensing responses periodically, the sensing response being one of the plurality of sensing responses.

In some example embodiments, the apparatus further comprises: means for receiving, from the core network device, an indication of a moving object with a high risk level for a vehicle associated with the terminal device; and means for causing the vehicle to be controlled to avoid a collision with the moving object.

In some example embodiments, the apparatus further comprises: means for receiving, from the core network device, an updated sensing response associated with an updated target sensing area determined based on the target sensing area and the change tendency.

In some example embodiments, the apparatus further comprises means for performing other steps in some example embodiments of the method 1700. In some example embodiments, the means comprises at least one processor; and at least one memory including computer program code, the at least one memory and computer program code configured to, with the at least one processor, cause the performance of the apparatus.

In some example embodiments, an apparatus capable of performing the method 1800 (for example, the access network device 120-1) may comprise means for performing the respective steps of the method 1800. The means may be implemented in any suitable form. For example, the means may be implemented in a circuitry or software module.

In some example embodiments, the apparatus comprises: means for receiving, at an access network device and from a core network device, a sensing instruction to sense a target sensing area determined based on an initial sensing area associated with a terminal device and a change tendency of the initial sensing area; means for obtaining a sensing result by sensing the target sensing area using a sensor of the access network device; and means for transmitting the sensing result to the core network device.

In some example embodiments, means for sensing the target sensing area comprises: means for obtaining, from the sensing instruction, at least one of first motion information of the terminal device and second motion information of a moving obstruction relative to the terminal device; and means for tracking the target sensing area based on the at least one of the first motion information and the second motion information.

In some example embodiments, the apparatus further comprises: means for in response to receiving, from the core network device, a sensing release instruction to release the sensing of the target sensing area, switching the sensor of the access network device into a power saving state.

In some example embodiments, the means for obtaining the sensing result comprises: means for determining an identifier of a moving object detected in the target sensing area; means for determining a position of the moving object, determining motion information of the moving object relative to the terminal device, and means for determining an identifier of the target sensing area.

In some example embodiments, the apparatus further comprises: means for obtaining, from the sensing instruction, resource allocation information for allocating sensing resources to the access network device for sensing the target sensing area; and means for sensing the target sensing area using the allocated sensing resources.

In some example embodiments, the apparatus further comprises: means for obtaining, from the sensing instruction, sensor configuration information for configuring the sensor of the access network device to sense the target sensing area; and means for configuring the sensor of the access network device based on the sensor configuration information.

In some example embodiments, the apparatus further comprises: means for receiving, from the core network device, a further sensing instruction to sense a further target sensing area overlapping the target sensing area; means for obtaining a further sensing result by sensing the further target sensing area using the sensor of the access network device; and means for transmitting the further sensing result to the core network device.

In some example embodiments, the apparatus further comprises: means for receiving, from the core network device, an updated sensing instruction to sense an updated target sensing area; means for obtaining an updated sensing result by sensing the updated target sensing area using the sensor of the access network device; and means for transmitting the updated sensing result to the core network device.

In some example embodiments, the apparatus further comprises means for performing other steps in some example embodiments of the method 1800. In some example embodiments, the means comprises at least one processor; and at least one memory including computer program code, the at least one memory and computer program code configured to, with the at least one processor, cause the performance of the apparatus.

Figure 19:
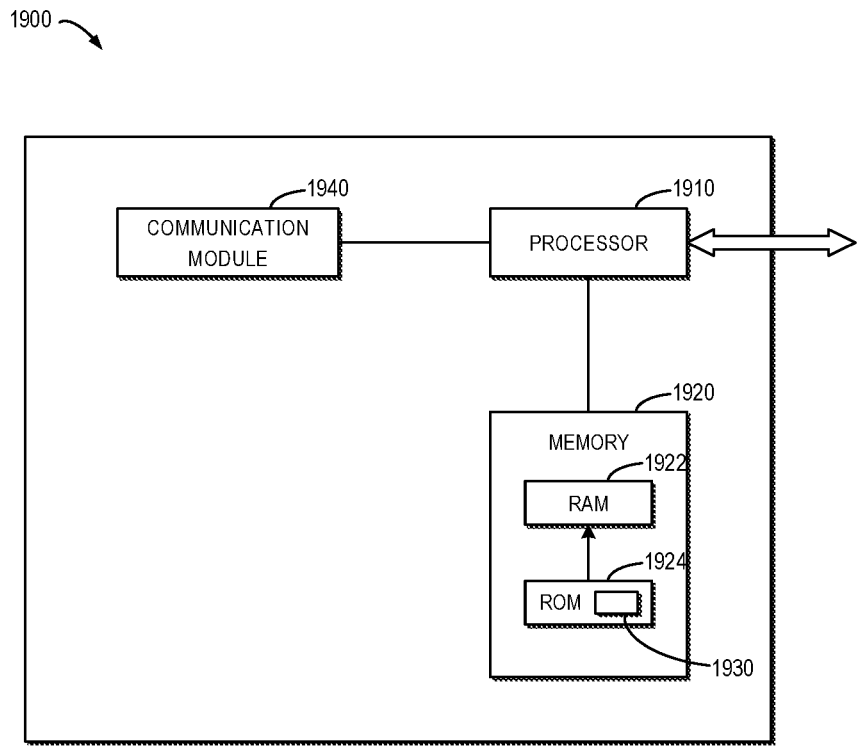
FIG. 19 illustrates a simplified block diagram of a device that is suitable for implementing some example embodiments of the present disclosure.

FIG. 19 illustrates a simplified block diagram of a device 1900 that is suitable for implementing some example embodiments of the present disclosure. The device 1900 may be provided to implement a communication device, for example, the core network device 110, the access network devices 120, or the terminal devices 130 as shown in FIG. 1. As shown, the device 1900 includes one or more processors 1910, one or more memories 1920 coupled to the processor 1910, and one or more communication modules 1940 coupled to the processor 1910.

The communication module 1940 is for bidirectional communications. The communication module 1940 has at least one antenna to facilitate communication. The communication interface may represent any interface that is necessary for communication with other network elements.

The processor 1910 may be of any type suitable to the local technical network and may include one or more of the following: general purpose computers, special purpose computers, microprocessors, digital signal processors (DSPs) and processors based on multicore processor architecture, as non-limiting examples. The device 1900 may have multiple processors, such as an application specific integrated circuit chip that is slaved in time to a clock which synchronizes the main processor.

The memory 1920 may include one or more non-volatile memories and one or more volatile memories. Examples of the non-volatile memories include, but are not limited to, a Read Only Memory (ROM) 1924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1922 and other volatile memories that will not last in the power-down duration.

A computer program 1930 includes computer executable instructions that are executed by the associated processor

1910. The program 1930 may be stored in the ROM 1924. The processor 1910 may perform any suitable actions and processing by loading the program 1930 into the RAM 1922.

The embodiments of the present disclosure may be implemented by means of the program 1930 so that the device 1900 may perform any process of the disclosure as discussed with reference to FIGS. 3 to 18. The embodiments of the present disclosure may also be implemented by hardware or by a combination of software and hardware.

In some example embodiments, the program 1930 may be tangibly contained in a computer readable medium which may be included in the device 1900 (such as in the memory 1920) or other storage devices that are accessible by the device 1900. The device 1900 may load the program 1930 from the computer readable medium to the RAM 1922 for execution. The computer readable medium may include any types of tangible non-volatile storage, such as ROM, EPROM, a flash memory, a hard disk, CD, DVD, and the like.

Figure 20:
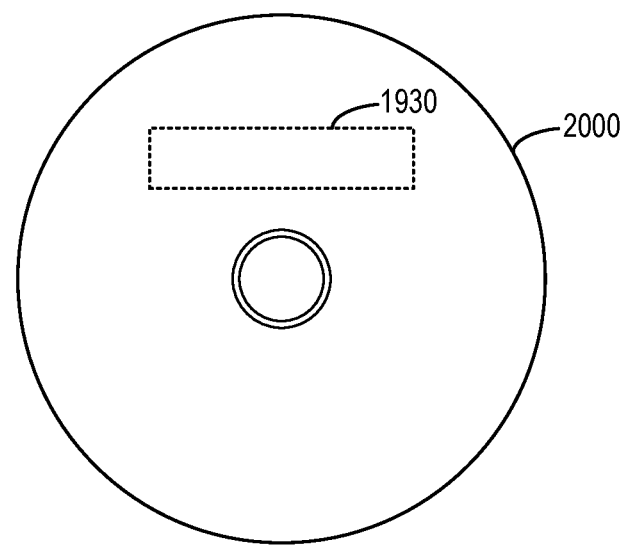
FIG. 20 illustrates a block diagram of an example of a computer readable medium in accordance with some example embodiments of the present disclosure.

FIG. 20 illustrates a block diagram of an example of a computer readable medium 2000 in accordance with some example embodiments of the present disclosure. The computer readable medium 2000 has the program 1030 stored thereon. It is noted that although the computer readable medium 2000 is depicted in form of CD or DVD in FIG. 20. the computer readable medium 2000 may be in any other form suitable for carry or hold the program 1030.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 1600, 1700 or 1800 as described above with reference to FIG. 16, 17 or 18. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
a processor; and
a transceiver communicatively coupled to the processor,
the processor configured to cause the terminal device to:
determine an initial sensing area and a change tendency of the initial sensing area,
wherein the initial sensing area comprises a blind spot of a user of the terminal device, an area out of sight of the user, an area unable to be sensed by a sensor associated with the terminal device, an area behind an obstruction, a roadside area lower than a road surface, and a blind spot inherent in a vehicle associated with the terminal device,
wherein the terminal device determines the initial sensing area based on a current position of the terminal device, edge points of a contour of the obstruction, a lower sensing radius of the initial sensing area, and an upper sensing radius of the initial sensing area,
wherein the terminal device is caused to determine the initial sensing area by:
  detecting the obstruction, wherein a distance from the terminal device to the obstruction is below a predefined threshold distance;
  determining, for a vehicle associated with the terminal device, whether there is a risk in a hidden area of the obstruction; and
  in response to determining that there is a risk in the hidden area, determining the hidden area as the initial sensing area,
wherein the terminal device is caused to detect the obstruction by:
  obtaining a LIDAR (Light Detection and Ranging) scan pattern of the obstruction using a LIDAR associated with the terminal device;
  obtaining an image of the obstruction using a camera associated with the terminal device; and
  determining the obstruction by matching the LIDAR scan pattern with the image,
wherein the terminal device is caused to determine whether there is a risk by:
  determining semantic information and environment information of the obstruction based on a knowledge database;
  evaluating that there is a moving object in the hidden area based on the semantic information and the environment information; and
  determining there is a possibility that the moving object collides with the vehicle associated with the terminal device, and
wherein the terminal device is caused to determine the change tendency by determining a current position of the terminal device, motion information of the terminal device, and motion information of a moving obstruction associated with the initial sensing area relative to the terminal device;
transmit, to a core network device, a sensing request indicating the initial sensing area and the change tendency,
  wherein the sensing request further comprises semantic information of an obstruction associated with the initial sensing area, an identifier of the initial sensing area, and an identifier of the terminal device;
receive, from the core network device, a sensing response associated with a target sensing area determined based on the initial sensing area and the change tendency, wherein the sensing response indicates one or more moving objects with a risk level for a vehicle associated with the terminal device above a predefined threshold level;
in a case that an area to be sensed is no longer determinable based on the initial sensing area and the change tendency, transmit to the core network device a Previously Presented sensing request indicating a Previously Presented initial sensing area and a Previously Presented change tendency of the Previously Presented initial sensing area; and
in a case that an area determined based on the initial sensing area and the change tendency no longer needs to be sensed, transmit a sensing release indication to the core network device.

* * * * *